US012731913B2

(12) United States Patent
Zhang et al.

(10) Patent No.: US 12,731,913 B2
(45) Date of Patent: Sep. 8, 2026

(54) ANTENNA AND ELECTRONIC DEVICE

(71) Applicant: Huawei Technologies Co., Ltd., Shenzhen (CN)

(72) Inventors: Xiang Zhang, Xi'an (CN); Chen Zhang, Xi'an (CN); Xiaofeng Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 47 days.

(21) Appl. No.: 18/720,394

(22) PCT Filed: Dec. 5, 2022

(86) PCT No.: PCT/CN2022/136696
§ 371 (c)(1),
(2) Date: Jun. 14, 2024

(87) PCT Pub. No.: WO2023/109556
PCT Pub. Date: Jun. 22, 2023

(65) Prior Publication Data

US 2025/0055205 A1 Feb. 13, 2025

(30) Foreign Application Priority Data

Dec. 15, 2021 (CN) ......................... 202111537509.6

(51) Int. Cl.
*H01Q 1/24* (2006.01)
*H01Q 9/06* (2006.01)
*H01Q 21/28* (2006.01)

(52) U.S. Cl.
CPC ............. *H01Q 21/28* (2013.01); *H01Q 9/065* (2013.01)

(58) Field of Classification Search
CPC .......... H01Q 1/24; H01Q 1/243; H01Q 1/521; H01Q 9/06; H01Q 9/065; H01Q 9/16; H01Q 9/285; H01Q 21/28
See application file for complete search history.

(56) References Cited

U.S. PATENT DOCUMENTS

| | | | | |
|---|---|---|---|---|
| 9,331,396 | B2 * | 5/2016 | Tran | H01Q 21/24 |
| 2017/0047642 | A1 * | 2/2017 | Li | H01Q 1/48 |
| 2017/0084997 | A1 * | 3/2017 | Wu | H01Q 1/50 |
| 2020/0235495 | A1 * | 7/2020 | Yang | H01Q 1/241 |

(Continued)

OTHER PUBLICATIONS

Hang Xu et al:"A Highly Integrated MIMO Antenna Unit: Differential/Common Mode Design." Jul. 26, 2019. total 11 pages.

(Continued)

*Primary Examiner* — Thai Pham
(74) *Attorney, Agent, or Firm* — Conley Rose, P.C.

(57) ABSTRACT

An antenna includes: a first antenna element, including a first radiation stub having a first feeding end and a second radiation stub having a second feeding end; a first feeding part, coupled to the first feeding end and the second feeding end of the first antenna element; a second antenna element, including a third radiation stub having a third feeding end and a fourth radiation stub having a fourth feeding end; a second feeding part, coupled to the third feeding end and the fourth feeding end of the second antenna element; and a coupling stub, coupled to the first antenna element through the first feeding end and the second feeding end, and coupled to the second antenna element through the third feeding end.

20 Claims, 10 Drawing Sheets

(56) References Cited

U.S. PATENT DOCUMENTS

| | | | | |
|---|---|---|---|---|
| 2022/0006191 | A1* | 1/2022 | Shibata | H01Q 5/307 |
| 2023/0318172 | A1* | 10/2023 | Liu | H01Q 5/50<br>343/725 |

OTHER PUBLICATIONS

Yantao Yu et al:"A compact printed monopole array with neutralization line for UWB applications." Oct. 27, 2016. total 2 pages.
Angus C. K. Mak et al:"Isolation Enhancement Between Two Closely Packed Antenna." Nov. 21, 2008. total 9 pages.
Yi-Feng Cheng et al:"Decoupling of Two-Element Printed-Dipole Antenna Array by Optimal Meandering Design." May 29, 2020. total 11 pages.
Libin Sun et al:"Antenna Decoupling by Common and Differential Modes Cancellation." Jul. 21, 2020. total 10 pages.

* cited by examiner

ANTENNA AND ELECTRONIC DEVICE

CROSS-REFERENCE TO RELATED APPLICATIONS

This is a National Stage of International Patent Application No. PCT/CN2022/136696, filed on Dec. 5, 2022, which claims priority to Chinese Patent Application No. 202111537509.6, filed on Dec. 15, 2021, both of which are hereby incorporated by reference in their entireties.

TECHNICAL FIELD

Embodiments of this application mainly relate to the antenna field. More specifically, embodiments of this application relate to an antenna and an electronic device including the antenna.

BACKGROUND

An antenna is a device used to transmit or receive radio waves, and is generally an electronic element of an electromagnetic wave. The antenna is used in systems such as radio and television, point-to-point radio communication, radar, and space exploration. Physically, the antenna is a conductor or a combination of a plurality of conductors. From the antenna, a radiating electromagnetic field can be generated due to applied time-varying voltage or a time-varying current. Alternatively, the antenna may be placed in an electromagnetic field, and a time-varying current is generated inside the antenna and time-varying voltage is generated at a terminal of the antenna due to field induction.

With the development of a mobile system, multi-band and multi-antenna systems become an important development trend of mobile communication. However, strong mutual coupling easily occurs between antenna elements with small space, and performance of an array antenna is distorted. For example, a multiple-input multiple-output (Multi-input Multi-output, MIMO) technology, as a main technology for improving a system channel capacity and improving spectrum resource utilization, greatly expands space for increasing a data transmission rate, and is a research hotspot in a current wireless communication field. As an indispensable terminal component of a wireless system, performance of the antenna determines overall performance of the system. As the wireless system continuously develops towards miniaturization, a distance between a plurality of antennas in a MIMO system is continuously reduced, and mutual coupling between antenna elements is continuously enhanced, so that multi-antenna performance is sharply reduced, and an advantage of the MIMO system is severely weakened. Improving isolation between the plurality of antennas and keeping miniaturization of a size of the antenna system are research hotspots in the antenna field.

SUMMARY

To improve antenna isolation and implement basic full coverage of an antenna on a horizontal plane, embodiments of this application provide an antenna and a related electronic device.

According to a first aspect of this application, an antenna is provided. The antenna includes a first antenna element, including a first radiation stub having a first feeding end and a second radiation stub having a second feeding end; a first feeding part, coupled to the first feeding end and the second feeding end of the first antenna element; a second antenna element, including a third radiation stub having a third feeding end and a fourth radiation stub having a fourth feeding end; a second feeding part, coupled to the third feeding end and the fourth feeding end of the second antenna element; and a coupling stub, coupled to the first antenna element through the first feeding end and the second feeding end, and coupled to the second antenna element through the third feeding end.

The coupling stub is disposed, so that the antenna according to this embodiment of this application can effectively isolate the first antenna element from the second antenna element. In addition, both the first antenna element and the second antenna element can implement basic full coverage on a horizontal plane, and this improves performance of the antenna without affecting a coverage rate of the antenna.

In an implementation, the coupling stub includes a first stub and a second stub, the first stub is electrically connected between the first radiation stub and the third radiation stub, and the second stub is electrically connected between the second radiation stub and the third radiation stub. In this arrangement manner, the antenna implements effective decoupling of the first antenna element and the second antenna element without affecting horizontal plane coverage in a simple manner.

In an implementation, the first stub and the second stub of the coupling stub are electrically connected to different ends of the third radiation stub separately. In this way, distribution of an induced current on the antenna can be improved, thereby promoting impedance matching and optimizing the performance of the antenna.

In an implementation, the first feeding end of the first radiation stub and the second feeding end of the second radiation stub are spaced apart to form a first slot, and the third feeding end of the third radiation stub and the fourth feeding end of the fourth radiation stub are spaced apart to form a second slot. In this manner, the first antenna element and the second antenna element may be fed in a simple and effective manner by using the first feeding part and the second feeding part.

In an implementation, the first antenna element and the second antenna element are collinear and spaced apart, and the coupling stub is located on a same side of the first radiation stub and the second radiation stub. A structure of the antenna formed in this manner is more compact, which further facilitates miniaturization of the electronic device.

In an implementation, the first antenna element and the second antenna element are parallel and spaced apart, and at least a part of the coupling stub is arranged in a spacing area between the first antenna element and the second antenna element. In this manner, an antenna arrangement manner is more flexible, to meet different requirements in various scenarios.

In an implementation, a width of the first radiation stub, a width of the second radiation stub, a width of the third radiation stub, or a width of the fourth radiation stub is greater than a width of the coupling stub. In this manner, impedance matching of the antenna can be promoted, thereby optimizing performance of the antenna.

In an implementation, a ratio of the width of the first radiation stub, or the width of the second radiation stub, or the width of the third radiation stub, or the width of the fourth radiation stub to the width of the coupling stub is within a range of 4:1 to 1:1. In this manner, widths of the radiation stub and the coupling stub may be properly set based on an operating frequency band of the antenna, to optimize performance of the antenna.

In an implementation, at least one of the first radiation stub, the second radiation stub, the third radiation stub, and the coupling stub is strip-shaped, and has a local widened part and/or a local narrowed part at a predetermined position. In this manner, the local widened part and/or the local narrowed part may be disposed at the predetermined position through operations such as simulation, to obtain optimal impedance matching.

In an implementation, at least one of the first radiation stub, the second radiation stub, the third radiation stub, and the coupling stub includes at least one local widened part, and the local widened part corresponds to a position with a smallest induced current on a corresponding stub. The local widened part is equivalent to introducing capacitor loading into the antenna, which is more conducive to impedance matching of the antenna system, thereby further improving performance of the antenna.

In an implementation, at least one of the first radiation stub, the second radiation stub, the third radiation stub, and the coupling stub includes at least one local narrowed part, and the local narrowed part corresponds to a position with a largest induced current on a corresponding stub. The local narrowed part is equivalent to introducing inductor loading into the antenna, which is more conducive to impedance matching of the antenna system, thereby further improving performance of the antenna.

In an implementation, the antenna is locally widened at at least one of the following positions: a connecting part of the coupling stub and the first antenna element, a connecting part of the coupling stub and the second antenna element, and a bending part of the coupling stub. This arrangement manner helps to optimize the current distribution on each stub, and this improves the performance of the antenna.

In an implementation, the coupling stub is coplanar with the first antenna element and the second antenna element. This arrangement manner facilitates manufacturing of the antenna and full coverage of in a horizontal plane.

In an implementation, the first antenna element and the second antenna element are dipole antenna elements. This arrangement manner provides a simple way to implement an antenna.

In an implementation, the first antenna element and the second antenna element include a same operating frequency band. In this manner, the antenna can implement full coverage of an operating frequency band on a horizontal plane.

According to a second aspect of this application, an electronic device is provided. The electronic device includes a housing; a circuit board, disposed in the housing; and the antenna according to the first aspect, where at least a part of the antenna is disposed on an inner side of the housing, and a first feeding part and a second feeding part of the antenna are disposed on the circuit board. By using the antenna mentioned in the first aspect, the electronic device can implement effective coverage of an operating frequency band on a horizontal plane, to improve performance of the electronic device.

In some implementations, the circuit board is separated from a first antenna element and a second antenna element of the antenna, and the first antenna element and the second antenna element are coupled to the first feeding part and the second feeding part through a coaxial cable. This arrangement manner is more conducive to improving performance of the electronic device, and enables the electronic device more convenient for manufacturing.

In an implementation, the electronic device further includes a dielectric substrate, configured to carry the first antenna element, the second antenna element, and a coupling stub. This arrangement manner provides a simple way to implement an antenna. In an implementation, the first antenna element, the second antenna element, and the coupling stub are printed on the dielectric substrate. This arrangement manner makes it easier to manufacture the antenna.

BRIEF DESCRIPTION OF DRAWINGS

The foregoing features, advantages and aspects and other features, advantages and aspects of embodiments of this application become clearer with reference to accompanying drawings and the following detailed descriptions. In the accompanying drawings, the same or similar reference signs of the accompanying drawings represent the same or similar elements.

DESCRIPTION OF EMBODIMENTS

Figure 1:
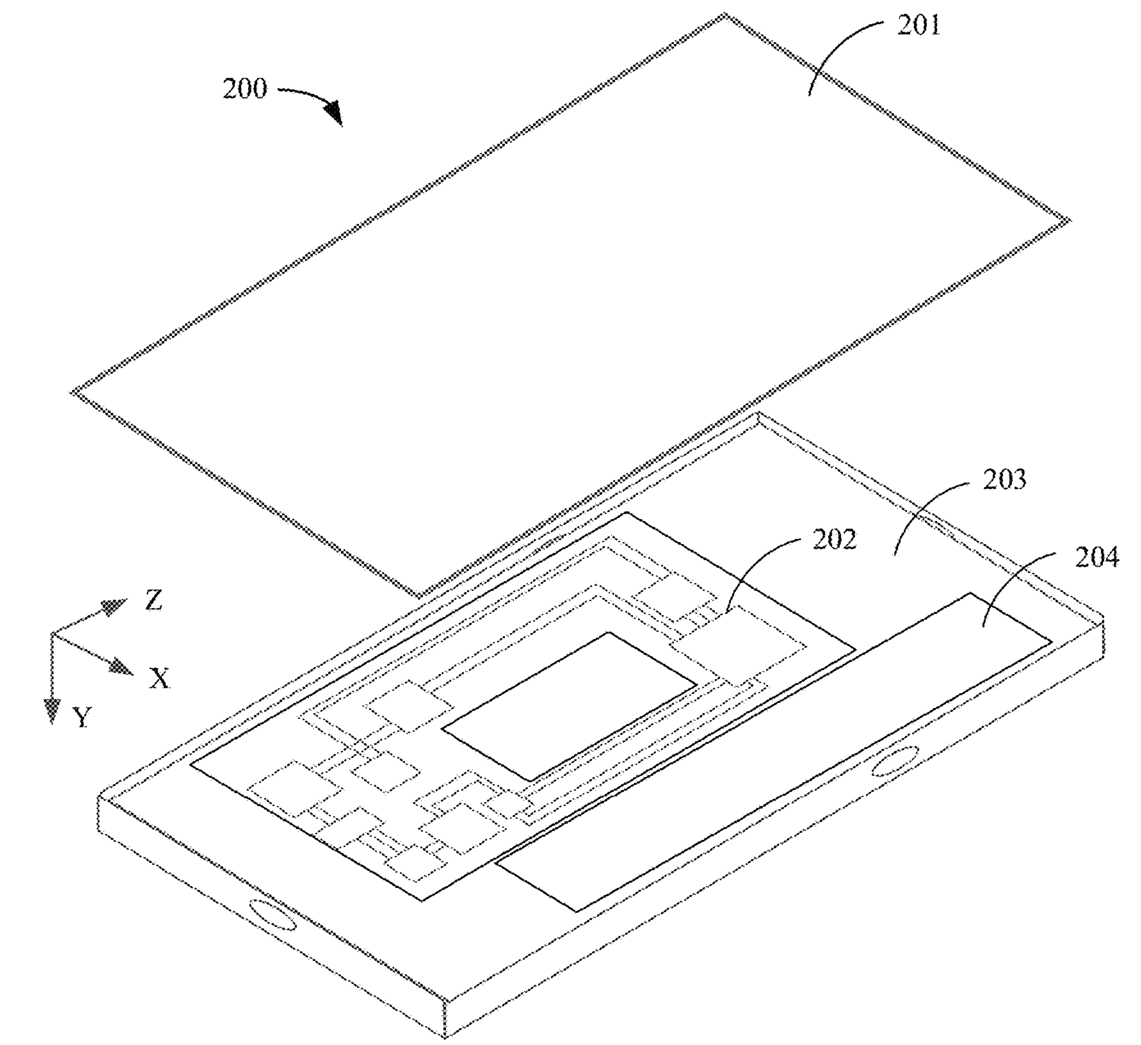
FIG. 1 is a schematic exploded view of an electronic device according to an embodiment of this application.

The following describes embodiments of this application in more detail with reference to accompanying drawings. Although some embodiments of this application are shown in the accompanying drawings, it should be understood that this application may be implemented in various forms and should not be construed to be limited to embodiments described herein. Instead, these embodiments are provided to understand this application more thoroughly and completely. It should be understood that, the accompanying drawings and embodiments of this application are merely used as examples, but are not used to limit the protection scope of this application.

In descriptions of embodiments of this application, the term "including" and similar terms should be understood as non-exclusive inclusion, namely, "including but not limited to". The term "based on" should be understood as "at least partially based on". The term "an embodiment" or "this embodiment" should be understood as "at least one embodiment". The terms "first", "second", and the like may refer to different or same objects. Other explicit and implicit definitions may also be included below.

It should be understood that, in this application, "connection" and "being connected to" may refer to a mechanical connection relationship or a physical connection relationship, that is, a connection between A and B or that A is connected to B may mean that there is a fastening component (like a screw, a bolt, or a rivet) between A and B, or A and B are in contact with each other and A and B are difficult to be separated.

It should be understood that in this application, "coupling" may be understood as direct coupling and/or indirect coupling. The direct coupling may also be referred to as an "electrical connection". The "electrical connection" may be understood as physical contact and electrical conduction of components. It may also be understood as a form in which different components in a line structure are connected through physical lines that can transmit an electrical signal, such as a printed circuit board (printed circuit board, PCB) copper foil or a conducting wire. The "indirect coupling" may be understood as that two conductors are electrically conducted in a spaced/non-contact manner. In an embodiment, indirect coupling may also be referred to as capacitive coupling. For example, signal transmission is implemented by forming an equivalent capacitor through coupling in a gap between two spaced conductive members.

Connection: Two or more components are conducted or connected in the foregoing "electrical connection" or "indirect coupling" manner to perform signal/energy transmission, which may be referred to as connection.

A radiator is an apparatus used to receive/transmit electromagnetic wave radiation in an antenna. In some cases, an "antenna" is a radiator in a narrow sense. The radiator converts guided wave energy from a transmitter into a radio wave, or converts a radio wave into guided wave energy to radiate and receive a radio wave. A modulated high-frequency current energy (or guided wave energy) generated by the transmitter is transmitted to a transmit radiator through a feeder cable. The radiator converts the energy into specific polarized electromagnetic wave energy and radiates the energy in a required direction. A receive radiator converts specific polarized electromagnetic wave energy from a specific direction in space into modulated high-frequency current energy, and transmits the energy to an input end of a receiver through the feeder cable.

The radiator may be a conductor having a specific shape and size, like a wire antenna. A wire antenna consists of one or more metal conducting wires whose cable sizes are much smaller than a wavelength and whose lengths are comparable to the wavelength. The wire antenna is mainly used in long, medium, short, and ultrashort wave bands as a transmit antenna or receive antenna. Main forms of wire antennas include the following: a dipole antenna, a half-wave dipole antenna, a cage antenna, a monopole antenna, a whip antenna, a tower antenna, a spherical antenna, a magnetic antenna, a V-shaped antenna, a rhombic antenna, a fishbone antenna, a Yagi antenna, a log-periodic antenna, and an antenna array. For the dipole antenna, each dipole antenna usually includes two radiation stubs, and each stub is fed by a feed part from a feed end of the radiation stub.

The radiator may also be a slot or a slit formed on a conductor. For example, an antenna formed by slotting on a conductor surface is referred to as a slot antenna or a slotted antenna. A typical shape of a slot is a long strip with a length of approximately half a wavelength. The slot may perform feeding by using a transmission line bridged on a narrow side of the slot, or may perform feeding by using a waveguide or a resonant cavity. In this case, a radio frequency electromagnetic field is excited above the slot, and an electromagnetic wave is radiated to space.

A feeder cable, also referred to as a transmission line, is a connection line between a transceiver and a radiator of an antenna. A system that connects a radiator of an antenna to a transceiver is referred as to a feed system. Feeder cables are classified into a wire transmission line, a coaxial cable transmission line, a waveguide, a microstrip, and the like based on different frequencies. A feed point refers to a connection point that is on the radiator and that is connected to the feeder cable.

Ground/ground plane: The ground/ground plane may usually refer to at least a part of any ground layer, or ground plane, or any ground metal layer in an electronic device, or refer to at least a part of any combination of the foregoing ground layer, a ground plane, a ground component, or the like. The "ground/ground plane" may be used to ground a component in the electronic device. In an embodiment, the "ground/ground plane" may be a ground layer of a circuit board of an electronic device, or may be a ground metal layer formed by a ground plane formed using a middle frame of the electronic device or a metal thin film below a screen in the electronic device. In an embodiment, the circuit board may be a printed circuit board (printed circuit board, PCB), for example, an 8-layer, 10-layer, or 12- to 14-layer board having 8, 10, 12, 13, or 14 layers of conductive materials, or an element that is separated and electrically insulated by a dielectric layer or insulation layer like glass fiber, polymer, or the like. In an embodiment, the circuit board includes a dielectric substrate, a ground layer, and a wiring layer, and the wiring layer and the ground layer are electrically connected through a via. In an embodiment, components such as a display, a touchscreen, an input button, a transmitter, a processor, a memory, a battery, a charging circuit, and a system on chip (system on chip, SoC) structure may be installed on or connected to a circuit board, or electrically connected to a wiring layer and/or a ground layer in the circuit board. For example, a radio frequency source is disposed at the wiring layer.

Any of the foregoing ground layers, or ground planes, or ground metal layers is made of conductive materials. In an embodiment, the conductive material may be any one of the following materials: copper, aluminum, stainless steel, brass and alloys thereof, copper foil on insulation laminates, aluminum foil on insulation laminates, gold foil on insulation laminates, silver-plated copper, silver-plated copper foil on insulation laminates, silver foil on insulation laminates and tin-plated copper, cloth impregnated with graphite powder, graphite-coated laminates, copper-plated laminates, brass-plated laminates and aluminum-plated laminates. A person skilled in the art may understand that the ground layer/ground plane/ground metal layer may alternatively be made of other conductive materials.

Resonance frequency: The resonance frequency is also referred to as a resonant frequency. The resonance frequency may be a frequency at which an imaginary part of input impedance of an antenna is zero. The resonance frequency may have a frequency range, that is, a frequency range in which resonance occurs. A frequency corresponding to a strongest resonance point is a center frequency minus a point frequency. A return loss feature of the center frequency can be less than −20 dB.

Operating frequency band: An antenna always operates within a specific frequency range (frequency band width) regardless of which antenna type. For example, an operating frequency band of an antenna that supports a B40 frequency band includes a frequency in a range of 2300 MHz to 2400 MHz, or in other words, the operating frequency band of the antenna includes the B40 frequency band. A frequency range that meets a specification requirement can be considered as the operating frequency band of the antenna. A width of the operating frequency band is referred to as an operating bandwidth. An operating bandwidth of an omnidirectional antenna may reach 3% to 5% of the center frequency. An operating bandwidth of a directional antenna may reach 5% to 10% of the center frequency. The bandwidth may be considered as a frequency range on both sides of the center frequency (for example, a resonance frequency of a dipole), and an antenna feature is within an acceptable value range of the center frequency.

Impedance and impedance matching: Impedance of an antenna usually refers to a ratio of a voltage to a current at an input end of the antenna. The antenna impedance is a measure of resistance to an electrical signal in an antenna. In general, input impedance of an antenna is a complex number. A real part is referred as to input resistance, which is represented by Ri; and the imaginary part is referred as to input reactance, which is represented by Xi. An antenna whose electrical length is far less than an operating wavelength has high input reactance. For example, a short dipole antenna has high capacitive reactance, and a smallring antenna has high inductive reactance. Input impedance of a half-wave dipole with a small diameter is approximately 73.1+j42.5 ohms. In an actual application, for ease of matching, it is generally expected that input reactance of a symmetric oscillator is zero. In this case, a length of the oscillator is referred to as a resonance length. A length of a resonant half-wave dipole is slightly shorter than a half wavelength in free space, and in engineering, it is estimated that the length is 5% shorter than the half wavelength. The input impedance of an antenna is related to a geometric shape, a size, a feed point location, an operating wavelength, and surrounding environment of the antenna. When a diameter of a wire antenna is small, input impedance changes smoothly with frequency, and impedance bandwidth of the antenna is wide.

A main purpose of studying antenna impedance is to realize matching between an antenna and a feeder cable. To match a transmit antenna with a feeder cable, input impedance of an antenna should be equal to characteristic impedance of the feeder cable. To match a receive antenna with a receiver, the input impedance of the antenna should be equal to a conjugate complex number of load impedance. The receiver usually has impedance of a real number. When the impedance of the antenna is a complex number, a matching network needs to be used to remove a reactance part of the antenna and make resistance parts of the antenna and the receiver equal.

When the antenna matches the feeder cable, power transmitted from the transmitter to the antenna or from the antenna to the receiver is the maximum. In this case, no reflected wave appears on the feeder cable, a reflection coefficient is 0, and a standing wave coefficient is 1. A matching quality of the antenna and the feeder cable is measured by a reflection coefficient or a standing wave ratio at an input end of the antenna. For the transmit antenna, if matching is poor, radiant power of the antenna decreases, loss on the feeder cable increases, and a power capacity of the feeder cable decreases. In serious cases, transmitter frequency “pulling” occurs, that is, an oscillation frequency changes.

Antenna pattern: The antenna pattern is also referred to as a radiation pattern. The antenna pattern refers to a pattern in which relative field strength (a normalized modulus value) of an antenna radiation field changes with a direction at a specific distance from the antenna. The antenna pattern is usually represented by two plane patterns that are perpendicular to each other in a maximum radiation direction of an antenna.

The antenna pattern usually includes a plurality of radiation beams. A radiation beam with highest radiation strength is referred to as a main lobe, and another radiation beam is referred to as a minor lobe or side lobe. In minor lobes, a minor lobe in an opposite direction of the main lobe is also referred to as a back lobe.

Antenna gain: The antenna gain represents a degree to which the antenna intensively radiates input power. Usually, a narrower main lobe of the antenna pattern indicates a smaller minor lobe, and a higher antenna gain.

Antenna system efficiency: The antenna system efficiency is a ratio of power radiated by the antenna to the space (namely, power that is effectively converted into an electromagnetic wave) to input power of the antenna. The system efficiency is actual efficiency obtained under consideration of antenna port matching, that is, the system efficiency of the antenna is the actual efficiency (namely, efficiency) of the antenna.

Antenna radiation efficiency: The antenna radiation efficiency is a ratio of power radiated by the antenna to space (namely, power that is effectively converted into an electromagnetic wave) to active power input to the antenna. Active power input to the antenna=Input power of the antenna—Loss power. The loss power mainly includes return loss power and ohmic loss power and/or dielectric loss power of metal. Radiation efficiency is a value used to measure a radiation capability of an antenna. A metal loss and a dielectric loss are factors that affect the radiation efficiency.

A person skilled in the art may understand that efficiency is generally represented by a percentage, and there is a corresponding conversion relationship between the efficiency and dB. An efficiency closer to 0 dB indicates better efficiency of the antenna.

dB, namely, decibel, is a logarithmic concept with a base of ten. The decibel is only used to evaluate a proportional relationship between a physical quantity and another physical quantity. It has no physical dimension. A difference between two quantities can be expressed as 10 decibels for each 10 times increase in a ratio of the two quantities. For example, if A=“100”, B=“10”, C=“5”, and D=“1”, A/D=20 dB, B/D=10 dB, C/D=7 dB, and B/C=3 dB. In other words, the difference between two quantities is 10 dB, then the difference is 10 times, and the difference is 20 dB, then the difference is 100 times. The rest may be deduced by analogy. The difference of 3 dB means two times the difference between the two quantities.

dBi: It is generally mentioned together with dBd. dBi and dBd are units of a power gain. They are relative values, but their reference values are different. A reference value for dBi is an omnidirectional antenna, and a reference value for dBd is a dipole. It is generally considered that dBi and dBd indicate a same gain. A value of dBi is 2.15 dBi greater than that of dBd. For example, if a gain of an antenna is 16 dBd, the gain is 18.15 dBi in a unit of dBi. Generally, the gain is 18 dBi ignoring decimal places.

Antenna return loss: The antenna return loss may be understood as a ratio of power of a signal reflected back to an antenna port through an antenna circuit to transmit power of the antenna port. A smaller reflected signal indicates a larger signal radiated by the antenna to space and higher radiation efficiency of the antenna. A larger reflected signal indicates a smaller signal radiated by the antenna to space and lower radiation efficiency of the antenna.

The antenna return loss may be represented by an S11 parameter, and S11 is one of S parameters. S11 indicates a reflection coefficient. The parameter may indicate transmit efficiency of the antenna. The S11 parameter is usually a negative number. A smaller S11 parameter indicates a smaller antenna return loss, and smaller energy reflected by the antenna, that is, more energy actually enters the antenna, and higher system efficiency of the antenna. A larger S11 parameter indicates a larger antenna return loss, and lower system efficiency of the antenna.

It should be noted that, in engineering, a value of S11 is generally −6 dB as a standard. When the value of S11 of the antenna is less than −6 dB, it may be considered that the antenna can work normally, or it may be considered that the transmit efficiency of the antenna is good.

Antenna isolation: The antenna isolation indicates a ratio of a signal transmitted by one antenna and received by another antenna to the transmit antenna. Isolation is a physical quantity used to measure a degree of mutual coupling between antennas. It is assumed that two antennas form a dual-port network, isolation between the two antennas is S21 and S12 between the two antennas. The antenna isolation may be represented by parameters S21 and S12. The parameters S21 and S12 are usually negative numbers. The smaller the parameters S21 and S12 are, the larger the isolation between the antennas is and the smaller the degree of mutual coupling between the antennas is. The larger the parameters S21 and S12 are, the smaller the isolation between the antennas is and the larger the degree of mutual coupling between the antennas is. The antenna isolation depends on an antenna radiation pattern, a space distance of the antenna, the antenna gain, and the like.

Electrical length: The electrical length may be expressed by multiplying a physical length (namely, mechanical length or geometric length) by a ratio of a transmission time period of an electrical or electromagnetic signal in a medium to a time period required by this signal to travel, in free space, for a distance that is the same as the physical length of the medium, and the electrical length may satisfy the following formula:

$$\overline{L} = L \times \frac{a}{b}$$

L is the physical length, a is the transmission time of the electrical or electromagnetic signal in the medium, and b is the transmission time in free space.

Alternatively, the electrical length may be a ratio of a physical length (namely, a mechanical length or a geometric length) to a wavelength of a transmitted electromagnetic wave. The electrical length may satisfy the following formula:

$$\overline{L} = \frac{L}{\lambda}$$

L is the physical length, and λ is the wavelength of the electromagnetic wave.

In an embodiment, a physical length of a radiator may be understood as an electrical length of the radiator±10%.

In this embodiment of this application, a wavelength in a wavelength mode (for example, a half-wavelength mode) of an antenna may be a wavelength of a signal radiated by the antenna. For example, a half-wavelength mode of a floating metal antenna may generate a resonance of a 1.575 GHz frequency band, where a wavelength in the half-wavelength mode is a wavelength of a signal radiated by the antenna in the 1.575 GHz frequency band. It should be understood that a wavelength of a radiation signal in the air may be calculated as follows: Wavelength=Speed of light/Frequency, where the frequency is a frequency of the radiation signal. A wavelength of a radiated signal in a medium may be calculated as follows: Wavelength=(Speed of light/$\vec{\varepsilon}$)/Frequency, where E is a relative dielectric constant of the medium, and the frequency is a frequency of the radiated signal. The slit and the slot in the foregoing embodiments may be filled with an insulation medium.

The wavelength in embodiments of this application may be an operating wavelength, and may be a wavelength corresponding to the center frequency of the resonance frequency or a center frequency of an operating frequency band supported by an antenna. For example, it is assumed that a center frequency of a B1 uplink frequency band (a resonance frequency is 1920 MHz to 1980 MHz) is 1955 MHz, an operating wavelength may be a wavelength calculated by using the frequency of 1955 MHz. Not limited to the center frequency, the "operating wavelength" may alternatively be a wavelength corresponding to a non-center frequency of the resonance frequency or the operating frequency band.

Co-directional/reverse distribution of currents mentioned in embodiments of this application should be understood as that directions of main currents on conductors on a same side are co-directional/reverse. For example, when co-directionally distributed currents are excited on an annular conductor (for example, a current path is also annular), it should be understood that although main currents excited on conductors on two sides of the annular conductor (for example, on conductors around a slot, or on conductors on two sides of a slot) are in reverse directions, the main currents still meet a definition of the co-directionally distributed currents in this application.

In embodiments of this application, the "end" in the "feeding end" and the "end" in "one end" cannot be understood as a point in a narrow sense, and may be considered as a radiator that includes a first end point on an antenna radiator, where the first end point is an end point of a first end on the antenna radiator. For example, a feeding end of the antenna radiator may be considered as a radiator in a range that is one-eighth first wavelength from the first end point. The first wavelength may be a wavelength corresponding to an operating frequency band of an antenna structure, or may be a wavelength corresponding to a center frequency of the operating frequency band, or a wavelength corresponding to a resonance point.

Collinearity, also referred to as coaxiality, means that a linear or band radiation stub of an antenna element basically extends along a same straight line. In an embodiment, collinearity may mean that two radiation stubs extend along a same straight line on an edge of a same side. In an embodiment, collinearity may mean that two radiation stubs extend along a same straight line in a midline of a width direction. In an embodiment, collinearity may mean that projections of two radiation stubs in their extension directions at least complement and overlap each other. The following describes embodiments of this application by mainly using an example in which collinearity means that two radiation stubs extend along a same straight line on an edge of a same side. Other cases are similar, and details are not described in the following.

Coplanarity means that stubs of an antenna element of an antenna are basically in a same plane in this application. For example, the antenna element may be disposed on a surface of a PCB board in a manner like printing.

Serial: Serial in this application means that two antenna elements are arranged in a collinear and spaced manner. A concept corresponding to serial is parallel, and parallel means that two antenna elements are arranged parallel to each other and spaced apart. The limitations such as collinearity, coaxiality, coplanarity, and parallel mentioned in the foregoing content of this application are all for a current process level, but are not absolutely strict definitions in a mathematical sense. For example, a deviation less than a predetermined threshold (for example, 0.1 mm) may exist in a line width direction between two radiation stubs of collinearity or edges of two antenna elements. An angle deviation of 5° may exist between two antenna elements that are parallel to each other. Provided that the deviation is within the foregoing deviation range, it may be considered collinear or parallel.

The technical solutions provided in this application are applicable to an electronic device that uses one or more of the following communication technologies: a Bluetooth (Bluetooth, BT) communication technology, a global positioning system (global positioning system, GPS) communication technology, a wireless fidelity (wireless fidelity, Wi-Fi) communication technology, a global system for mobile communications (global system for mobile communications, GSM) communication technology, a wideband code division multiple access (wideband code division multiple access, WCDMA) communication technology, a long term evolution (long term evolution, LTE) communication technology, a 5G communication technology, and other future communication technologies. The electronic device in embodiments of this application may include a device that directly connects a user front end to an operator network, and includes but is not limited to: customer premises equipment (Customer Premises Equipment, CPE), a telephone set, a wireless router, a firewall, a computer, an optical modem, a 4G-to-Wi-Fi wireless router, and the like. The electronic device in embodiments of this application may also include a mobile phone, a tablet computer, a notebook computer, a smart household, a smart band, a smartwatch, a smart helmet, smart glasses, and the like. Alternatively, the electronic device may be a handheld device that has a wireless communication function, a computing device, another processing device connected to a wireless modem, an in-vehicle device, an electronic device in a 5G network, an electronic device in a future evolved public land mobile network (public land mobile network, PLMN), or the like. This is not limited in this embodiment of this application.

Simply speaking, the CPE functions as a signal repeater. When a wireless fidelity (Wireless Fidelity, Wi-Fi) router spreads network signals, the signals are usually spread within a specific range. When the signals are blocked by a wall, the signals are further weakened. In this case, the signal repeater can be used to relay Wi-Fi signals again to expand Wi-Fi coverage.

In our daily life, products such as a Wi-Fi signal amplifier with similar functions are often seen. However, the CPE not only relays a Wi-Fi signal, but also relays a 4G or 5G network signal transmitted by an operator's base station by using a built-in subscriber identity module (Subscriber Identity Module, SIM) card, and then converts the 4G or 5G signal into a Wi-Fi signal for another device to connect. The CPE supports access of a plurality of mobile terminals and are widely used in places such as a home, a hospital, a factory, a shopping mall, and an office. Compared with a wired network, the CPE is more flexible in an application scenario and facilitates network construction.

An electronic device like the CPE is shown in FIG. 1. The electronic device 200 usually includes a housing 203, a cover 201, a circuit board 202, and an antenna 100. The housing 203 and the cover 201 may be assembled to form internal space for accommodating the circuit board 202 and the antenna 100. The circuit board 202 is a carrier configured to carry a processing unit of the electronic device 200 and a processing circuit of an antenna (for example, a transceiver and the like). The antenna 100 and the circuit board 202 may be disposed separately, and the antenna 100 is usually disposed at a location adjacent to an inner side of the housing 203. The antenna 100 is connected to the processing circuit of the antenna by using a transmission line such as a coaxial cable or a microstrip, to feed an antenna element of the antenna 100.

Certainly, it should be understood that a structure and an arrangement of the electronic device shown in FIG. 1 are merely examples, and are not intended to limit the protection scope of this application. Another electronic device of any appropriate structure or arrangement is also possible as long as applicable. For example, in some embodiments, the antenna 100 may alternatively be integrated into the circuit board 202 or disposed as a part of a frame of the housing 203. In addition, in an embodiment, the antenna 100 may be in a form of an antenna based on a flexible printed circuit (Flexible Printed Circuit, FPC), an antenna based on laser direct structuring (Laser Direct structuring, LDS), an antenna like a microstrip disk antenna (Microstrip Disk Antenna, MDA), and the like. In an embodiment, the antenna may alternatively use a transparent structure embedded in a screen of the electronic device, so that the antenna is a transparent antenna element embedded in the screen of the electronic device. The following mainly uses the structure shown in FIG. 1 as an example to describe the electronic device 200 according to this embodiment of this application. It should be understood that another electronic device 200 is similar. Details are not separately described below.

With development of communication technologies, a multi-input multi-output (Multi-input Multi-output, MIMO) system technology is widely applied to a terminal product, and an electronic device like CPE has an increasing quantity of antennas. How to deploy a plurality of antennas in limited space and ensure isolation between antennas becomes a key problem that needs to be resolved.

In an embodiment, a blocking method may be used to improve isolation. The blocking method is to set an obstacle on an electromagnetic coupling channel to block electromagnetic coupling. For example, a parabolic antenna addition surrounding edge is used for microwave communication interruption. A parabolic antenna with an addition surrounding edge may be referred to as a high-performance antenna, and a front-to-rear ratio index of the parabolic antenna is improved by about 15 dB compared with a standard antenna.

In an embodiment, an orthogonal polarization method may be used to improve isolation. The orthogonal polarization method means that two antennas are orthogonally polarized. For a duplex antenna, two orthogonal linear polarizations or two orthogonal circular polarizations are used to transmit and receive, respectively, to improve an isolation effect. For a dipole antenna, for two dipoles that are placed in parallel, a parasitic stub is disposed between the two dipoles to perform decoupling, to improve isolation. In this way, isolation within a frequency band (2.4 GHz to 2.5 GHz) can reach more than −10 dB. In this embodiment, an intermediate parasitic stub and the dipole are arranged in a three-dimensional manner, and this increases a size of the antenna.

In an embodiment, decoupling may be performed between antennas through a decoupling network. The decoupling network generally uses a lumped element. The lumped element is a general term for all elements when an element size is far less than a relative wavelength of an operating frequency of a circuit. For a signal, an element feature is always specific at any time, regardless of the frequency. On the contrary, if the element size is close to or greater than the wavelength of the operating frequency of the circuit, when the signal passes through the element, features of the elements vary with signal change. In this case, the element cannot be regarded as a single entity with a specific feature, but should be called a distributed element. In this embodiment, a good isolation effect can be achieved, and a size of an antenna is increased. Because a lumped element is used, costs of the antenna increase.

In an embodiment, for two dipole antennas disposed in series, another manner of improving isolation is to partially bend dipoles, so that some of the dipoles are parallel to each other, to decouple the dipoles by using reverse cancellation of a coupling current of a serial part and a coupling current of a parallel part. This solution may alternatively be considered as a deformation of a cross-placed dipole antenna based on vector superposition. In this embodiment, high isolation can be achieved, and a width of an antenna increases.

It can be seen from the foregoing brief descriptions of the embodiment for improving isolation that the foregoing several solutions basically depend on decoupling provided in a width direction, that is, an antenna size increases. Alternatively, a high-cost electronic component like a lumped element is used, and this increases the costs of the antenna.

An embodiment of this application further provides an antenna, so that isolation between two antenna elements can be effectively improved without significantly increasing a size and costs of the antenna. For an antenna in CPE, because radiation directions of antenna elements of the antenna are basically omnidirectional antennas in a horizontal plane direction, a decoupling effect is particularly obvious.

Figure 2:
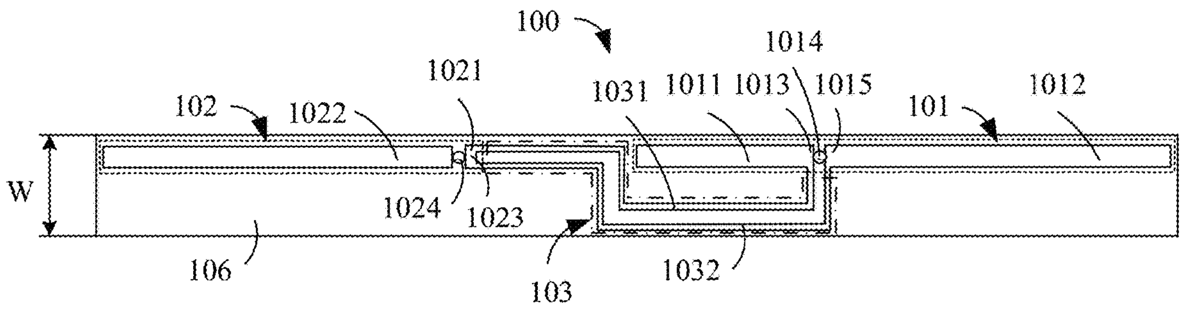
FIG. 2 is a schematic top view of an antenna whose antenna elements are arranged in serial according to an embodiment of this application.
Figure 3:
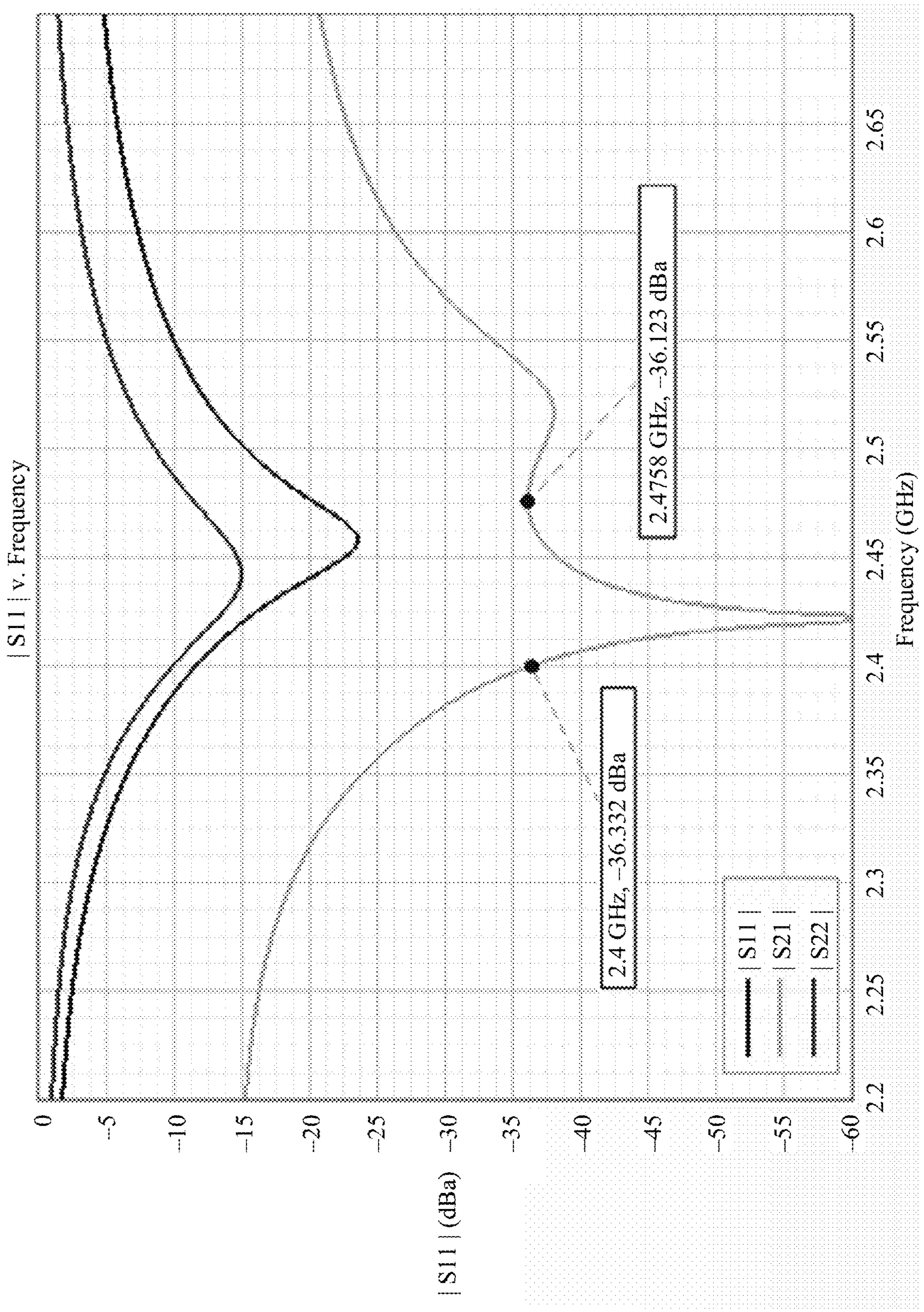
FIG. 3 shows S11 pairs of frequency curves of antennas whose antenna elements are arranged in serial according to an embodiment of this application.

The following describes example embodiments of the antenna 100 in this application with reference to FIG. 2 to FIG. 5. FIG. 2 shows an example structure of an antenna 100. As shown in FIG. 2, generally, the antenna 100 according to this embodiment of this application includes two antenna elements: a first antenna element 101 and a second antenna element 102. In some embodiments, the first antenna element 101 and the second antenna element 102 may be coplanar. This may be implemented by printing the first antenna element 101 and the second antenna element 102 on a dielectric substrate 106. The dielectric substrate 106 may be a printed circuit board (Printed Circuit Board, PCB). In some embodiments, the first antenna element 101 and the second antenna element 102 may be disposed on a top surface of the dielectric substrate 106 in a printing manner. For a bottom surface of the dielectric substrate 106, a configuration of clearance without copper coating may be used, and clearance arrangement of the antenna may ensure radiation performance of the antenna.

Certainly, it should be understood that the embodiment in which the first antenna element 101 and the second antenna element 102 are disposed on the PCB board in a printing manner is merely an example, and is not intended to limit the protection scope of this application. Any other appropriate manner is also possible. For example, in some alternative embodiments, the dielectric substrate 106 may alternatively be a polyester film, a polyimide substrate, or the like used to form a flexible circuit board. The first antenna element 101 and the second antenna element 102 may be formed on a polyester film or a polyimide substrate through pattern transfer, etching, or the like.

The two antenna elements are fed by feeding parts. In the following, for ease of description, a feeding part used to feed the first antenna element 101 is referred to as a first feeding part 1014, and a feeding part used to feed the second antenna element 102 is referred to as a second feeding part 1024. In an embodiment, the first antenna element 101 and the second antenna element 102 may use a dipole antenna structure. Certainly, it should be understood that the dipole antenna structure is merely an example, and is not intended to limit the protection scope of this application. Any other suitable antenna 100 with the structure mentioned in the following description is also possible. In this specification, embodiments of this application are described mainly by using an example in which both antenna elements are dipole antennas 100. Other types of antennas 100 with a similar structure are similar. Details are not described in the following.

Each of the two antenna elements includes two radiation stubs. Specifically, the first antenna element 101 includes a first radiation stub 1011 and a second radiation stub 1012. In an embodiment, the first radiation stub 1011 and the second radiation stub 1012 are of a substantially collinear or coaxial structure. The first radiation stub 1011 and the second radiation stub 1012 each include a feeding end, which are respectively referred to as a first feeding end 1013 and a second feeding end 1015. The first feeding part 1014 feeds the first radiation stub 1011 and the second radiation stub 1012 through the first feeding end 1013 and the second feeding end 1015.

Similarly, the second antenna element 102 includes a third radiation stub 1021 and a fourth radiation stub 1022. In an embodiment, the third radiation stub 1021 and the fourth radiation stub 1022 are also of a substantially collinear or coaxial structure. The third radiation stub 1021 and the fourth radiation stub 1022 each include a feeding end, which are respectively referred to as a third feeding end 1023 and a fourth feeding end. The second feeding part 1024 feeds the third radiation stub 1021 and the fourth radiation stub 1022 through the third feeding end 1023 and the fourth feeding end.

FIG. 2 shows that feeding ends of the two antenna elements are both disposed at one end that is of the radiation stub and that is close to each other. It should be understood that this is merely an example, and is not intended to limit the protection scope of this application. Any other appropriate feeding manner is also possible. For example, in some alternative embodiments, the feeding end may alternatively be disposed at one end that is of the radiation stub and that is away from each other or any end. The following describes an inventive concept of this application mainly by using an example shown in the figure as an example. It should be understood that other arrangement manners are similar. Details are not separately described in the following.

The first antenna element 101 and the second antenna element 102 may include a same operating frequency band. For example, in an embodiment, both the first antenna element 101 and the second antenna element 102 may operate in a frequency band of 2.4 GHz to 2.5 GHz, and implement high isolation. In an alternative embodiment, the first antenna element 101 and the second antenna element 102 may operate in a similar frequency band. For example, the first antenna element 101 operates on a 2.4 GHz frequency band, and the second antenna element 102 operates on a 2.5 GHz frequency band. In addition, the antenna according to embodiments of the disclosure may operate as a multi-input multi-output (Multi-input Multi-output, MIMO) system antenna. In other words, the example embodiments described in this disclosure are also used in a case in which an antenna is used as a MIMO antenna.

The antenna 100 in this embodiment of this application further includes a coupling stub 103. The coupling stub 103 may be a stub coupled between two antenna elements to implement a predetermined function like decoupling. FIG. 2 shows an example embodiment in which the coupling stub 103 is arranged between two antenna elements arranged in serial. As shown in FIG. 2, the coupling stub 103 is coupled to the first antenna element 101 through the first feeding end 1013 and the second feeding end 1015, for example, is coupled to the first radiation stub 1011 and the second radiation stub 1012 separately. The coupling stub 103 is coupled to the second radiation unit through the third feeding end 1023, for example, is coupled only to the third radiation stub 1021.

To implement the foregoing connection manner, in an embodiment, the coupling stub 103 may include two stubs (which are respectively referred to as a first stub 1031 and a second stub 1032 below). The first stub 1031 is electrically connected between the first radiation stub 1011 and the third radiation stub 1021. The second stub 1032 is electrically connected between the second radiation stub 1012 and the third radiation stub 1021, as shown in FIG. 2. To implement electrical connection and impedance matching of an antenna system (including a radiation stub, a feeding network, and the like), in an embodiment, the first stub 1031 and/or the second stub 1032 may include a bending part and a local widened part 104 and/or a local narrowed part 105. In addition, at least one of the first radiation stub 1011, the second radiation stub 1012, and the third radiation stub 1021 and a connection part between the stub and the coupling stub 103 may have the local widened part 104 and/or a local loading part to implement impedance matching of the antenna system. These are further elaborated below.

FIG. 2 also shows that in a case in which the coupling stub 103 is arranged in the antenna 100 in serial, the first stub 1031 and the second stub 1032 may be located on a same side of the first radiation stub 1011 and the second radiation stub 1012. This arrangement manner is more conducive to manufacturing and arrangement of the antenna 100, and is more conducive to decoupling. In an embodiment, the first stub 1031 and the second stub 1032 may alternatively be separately disposed on different sides of the first radiation stub 1011 and the second radiation stub 1012.

In some embodiments, two feeding ends of each radiation stub are spaced apart to form a slot. Specifically, a first slot is formed between the first feeding end 1013 of the first radiation stub 1011 and the second feeding end 1015 of the second radiation stub 1012. In addition, a second slot is formed between the third feeding end 1023 of the third radiation stub 1021 and the fourth feeding end of the fourth radiation stub 1022. The first feeding part 1014 and the second feeding part 1024 are respectively coupled to the first slot and the second slot to feed the first antenna element 101 and the second antenna element 102. In this manner, the first feeding part 1014 and the second feeding part 1024 may feed the first antenna element 101 and the second antenna element 102 in a simple and reliable manner.

At least one of the first radiation stub 1011, the second radiation stub 1012, the third radiation stub 1021, and the coupling stub 103 is disposed in a strip shape, a line shape, or a band shape. The strip shape, the line shape, or the band shape means that line widths or diameters of these stubs are far less than their extension lengths. For sizes (including respective lengths, widths, and the like) of the radiation stubs and the coupling stubs 103, factors such as impedance matching are considered, and a correlation exists between these sizes. For example, for a radiation stub of each antenna, there is a correspondence between a total length in an extension direction of the radiation stub and a wavelength λ corresponding to an operating frequency band of the antenna 100. For example, a total length of the first radiation stub 1011 and the second radiation stub 1012 in an extension direction may be between 0.4λ and 0.5λ. For example, for an antenna whose operating frequency band is 2.4 GHz to 2.5 GHz, a total length of the first radiation stub 1011 and the second radiation stub 1012 may be between 4.5 cm and 6 cm. Factors such as impedance matching are considered, and lengths of the first radiation stub 1011 and the second radiation stub 1012 may be the same or different. In some embodiments, a ratio of the first radiation stub 1011 to the second radiation stub 1012 may be between 1:2.5 and 1:1. For example, for an antenna that is disposed in serial and whose operating frequency band is 2.4 GHz to 2.5 GHz, a length of the first radiation stub 1011 may be set to 1.45 cm, and a length of the second radiation stub 1012 may be set to 2.9 cm. For an antenna that is disposed in parallel and whose operating frequency band is 2.4 GHz to 2.5 GHz, a length of the first radiation stub 1011 may be set to 2.05 cm, and a length of the second radiation stub 1012 may be set to 2.65 cm. A total length of the second antenna element 102 is similar.

Lengths of the first stub 1031 and the second stub 1032 of the coupled stub 103 are set to increase a path of an induced current on the antenna by about one wavelength compared with an antenna without the coupling stub 103. For example, for an antenna that is disposed in serial and whose operating frequency band is 2.4 GHz to 2.5 GHz, a length of the first stub 1031 of the coupling stub 103 may be between 4 cm and 5 cm, for example, 4.3 cm, and a length of the second stub 1032 may be between 2 cm and 2.5 cm, for example, 2.2 cm. For an antenna that is disposed in parallel and whose operating frequency band is 2.4 GHz to 2.5 GHz, a length of the first stub 1031 may be between 1 cm and 1.8 cm, for example, 1.4 cm, and a length of the second stub 1032 may be between 2 cm and 3 cm, for example, 2.7 cm.

Widths of the radiation stubs and the coupling stub 103 mainly affect impedance of the antenna 100. An appropriate stub width may enable the antenna to obtain a better S parameter. For the widths of the radiation stubs and the coupling stub 103, in consideration of factors such as impedance matching, in some embodiments, a width of each radiation stub may be greater than a width of the coupling stub 103. In other words, a width of the first radiation stub 1011, the second radiation stub 1012, the third radiation stub 1021, or the fourth radiation stub 1022 may be greater than the width of the coupling stub 103. For example, in some embodiments, an initial width of the first radiation stub 1011, the second radiation stub 1012, the third radiation stub 1021, or the fourth radiation stub 1022 may be selected based on a wire whose feature impedance is 50 ohms. For example, in some embodiments, an initial line width of the radiation stub may require only 0.01 wavelength or shorter, for example, less than or equal to 0.15 cm±10%. An initial line width of the coupling stub 103 may be selected based on a wire whose feature impedance is 70 ohms to 75 ohms.

Factors such as an operating frequency band and impedance matching are considered, and a ratio of the width of the first radiation stub 1011, the second radiation stub 1012, the third radiation stub 1021, or the fourth radiation stub 1022 to the width of the coupling stub 103 may be within a range of 4:1 to 1:1. For the induced current on the antenna 100, except that a largest current and a smallest current (for example, a zero current) are basically distributed on the stubs at an interval of ¼ wavelength, because the coupling stub 103 has a bending part and the coupling stub 103 has a connection part of the first radiation stub 1011, the second radiation stub 1012, and the third radiation stub 1021, the induced currents distributed on the stubs are uneven. In some embodiments, to achieve better impedance matching, the radiation stub and/or the coupling stub 103 of the antenna 100 may include a local widened part 104 and/or a local narrowed part 105. This is further described below.

Certainly, it should be understood that the foregoing embodiments about sizes of the radiation stub and the coupling stub 103 are merely examples, and are not intended to limit the protection scope of this disclosure. The radiation stub and the coupling stub 103 may have any other appropriate size or structure provided that better impedance matching and antenna performance can be achieved.

The following separately describes two feeding parts with reference to a structure in FIG. 2. A case in which the two feeding parts feed two antenna elements is used to describe how to implement high isolation of the antenna 100 according to this embodiment of this application without affecting a radiation directivity pattern in a horizontal direction. Specifically, when the first feeding part 1014 feeds the first antenna element 101 through the first feeding end 1013 and the second feeding end 1015, the induced current flows into the coupling stub 103 through the first radiation stub 1011 and the second radiation stub 1012, and then flows into the third radiation stub 1021 through the coupling stub 103. In this case, the induced current is in a same direction on the first radiation stub 1011 and the second radiation stub 1012, and changes to a current reverse direction after passing through the first stub 1031 and the second stub 1032 of the coupling stub 103, so that a return current is formed on the third radiation stub 1021 and basically does not flow to the fourth radiation stub 1022. In this case, the antenna 100 operates in a first mode.

When the second feeding part 1024 feeds the second antenna element 102 through the third feeding end 1023 and the fourth feeding end, the induced current flows into the coupling stub 103 after passing through the third radiation stub 1021 and the fourth radiation stub 1022, and then separately flows into the first radiation stub 1011 and the second radiation stub 1012 through the coupling stub 103. In this case, the induced current is in a same direction on the third radiation stub 1021 and the fourth radiation stub 1022, and then flows in a reverse direction after passing through the coupling stub 103, so that the induced current is in a reverse direction on the first radiation stub 1011 and the second radiation stub 1012. In this case, the antenna 100 operates in a second mode.

In other words, when the first feeding part 1014 feeds the first antenna element 101, the antenna 100 operates in the first mode. When the second feeding part 1024 feeds the second antenna element 102, the antenna 100 operates in the second mode. When the first feeding part 1014 performs feeding, the second antenna element 102 is not excited through mutual coupling, so that a current flows into the second feeding part 1024. As mentioned above, a current flowing into the third radiation stub 1021 forms a return current on the third radiation stub 1021 and the second stub 1032 of the coupling stub 103. When the second feeding part 1024 performs feeding, because currents on the first radiation stub 1011 and the second radiation stub 1012 are reverse, no current flows into the first feeding part 1014.

It can be learned that, by using the coupling stub 103, the two antenna elements can be effectively isolated when operating (for example, when feeding is performed on the first feeding part 1014 and the second feeding part 1024 separately). It can be clearly learned from the schematic diagram of antenna parameters shown in FIG. 3 that isolation between two antenna elements of the antenna 100 that is arranged in serial according to this embodiment of this application can reach more than −36 dB, and may reach a maximum of −60 dB, and this implements high isolation.

Figure 4:
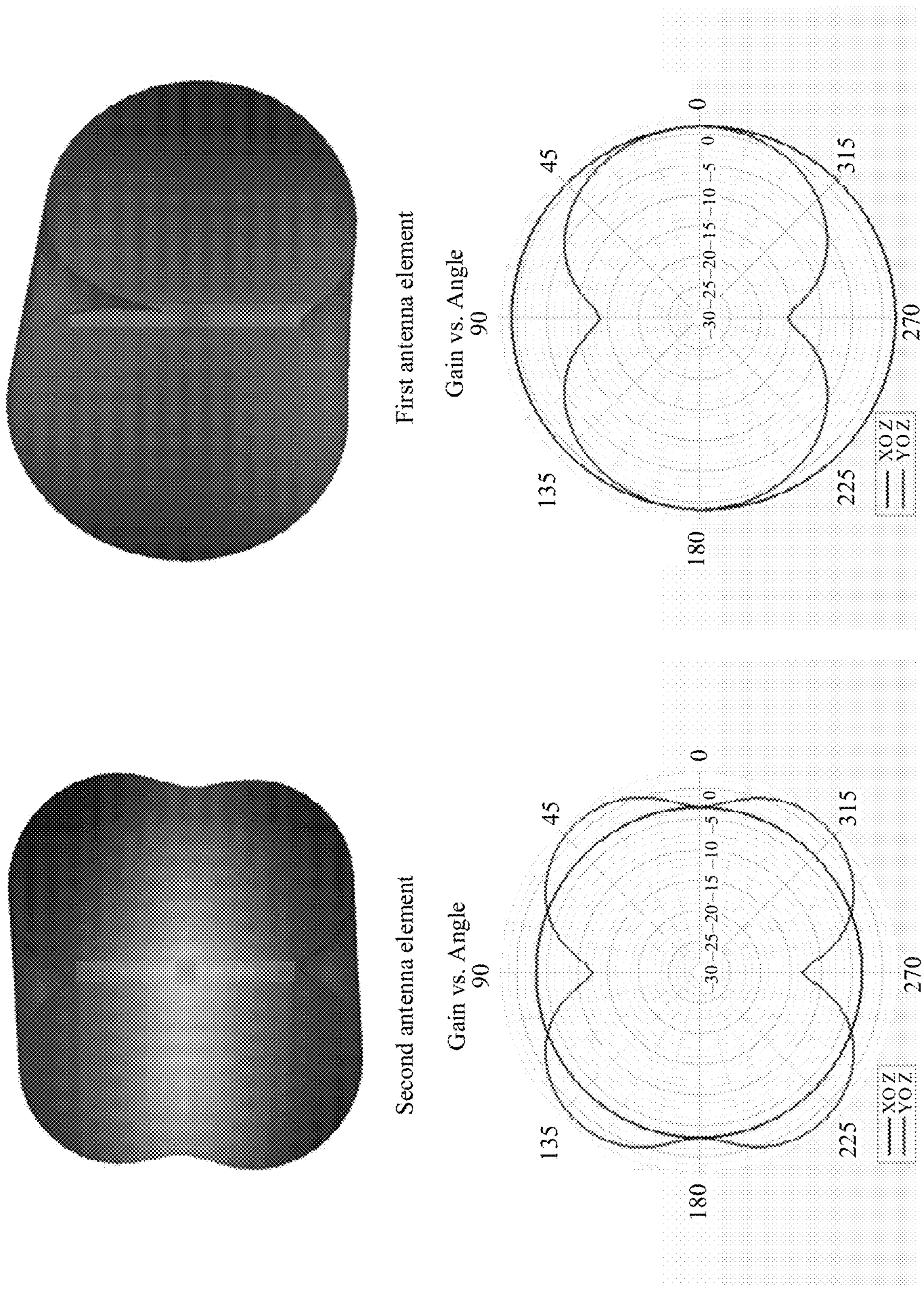
FIG. 4 shows a radiation pattern of an antenna whose antenna elements are arranged in serial according to an embodiment of this application.

FIG. 4 shows a radiation directivity diagram of an antenna 100 according to an embodiment of this application. An XOZ plane is a horizontal plane, a radiation directivity diagram of a second antenna element 102 is on a left side, and a radiation directivity diagram of a first antenna element 101 is on a right side. It can be learned from FIG. 4 that, different from several isolation solutions mentioned above, the directivity diagrams of the two antenna elements of the antenna 100 according to this embodiment of the present disclosure can basically cover a horizontal plane. A maximum radiation direction of the first antenna element 101 is basically on a horizontal plane. Although there is a lobe in the radiation pattern of the second antenna element 102, a horizontal plane gain can still reach −3 dBi, so that good coverage of the horizontal plane can be implemented.

Figure 5:
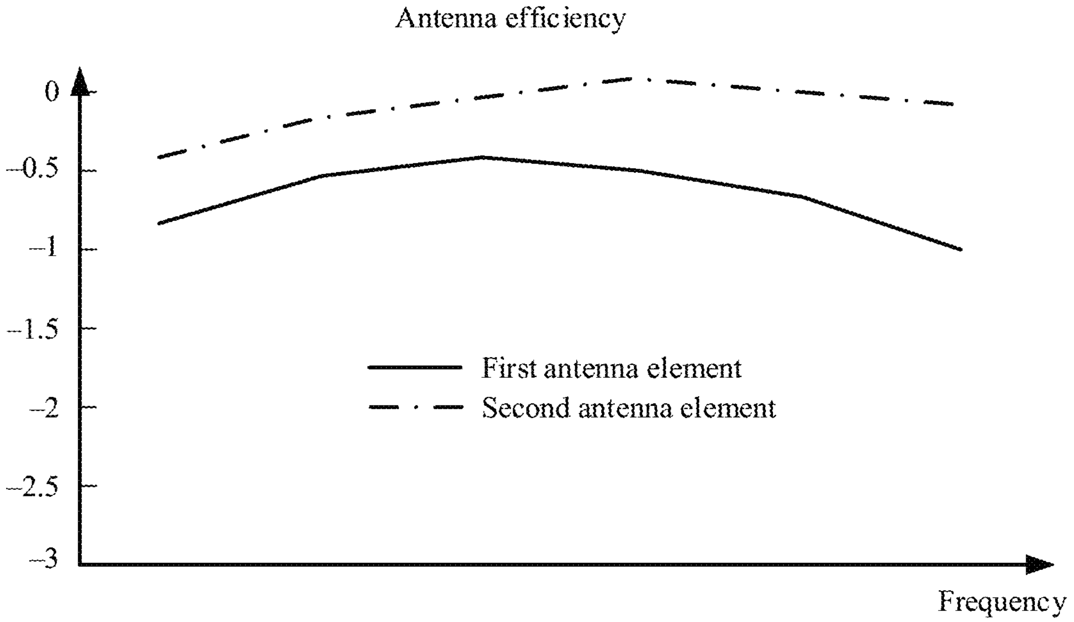
FIG. 5 is a schematic diagram of antenna efficiency of an antenna whose antenna elements are arranged in serial according to an embodiment of this application.

FIG. 5 is a schematic diagram of antenna efficiency of an antenna 100 according to an embodiment of this application. It can be learned from FIG. 5 that, both the two antenna elements have high efficiency, and can meet a requirement that an imbalance degree between the two antenna elements is less than 3 dB in actual use.

Figure 6:
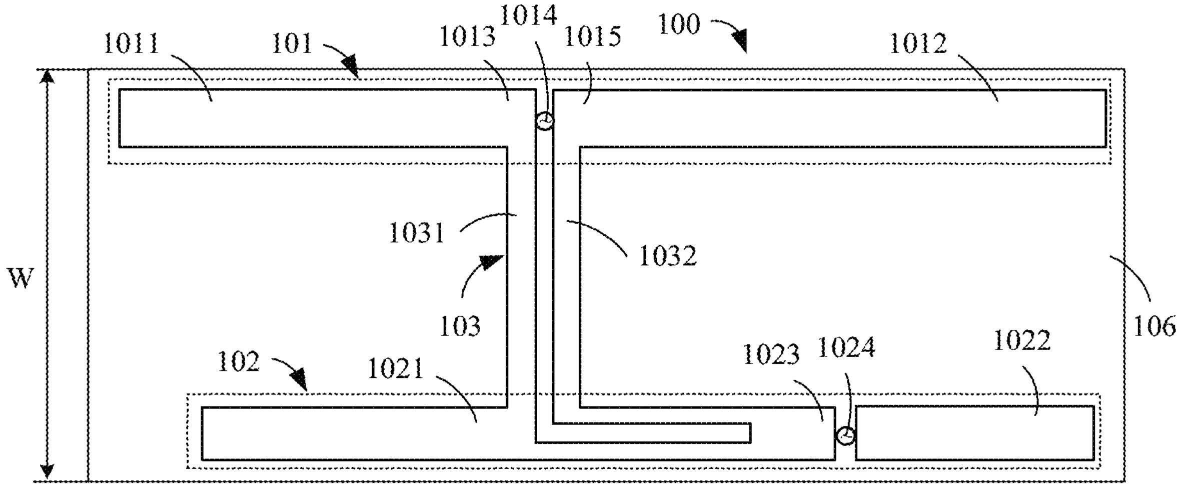
FIG. 6 is a schematic top view of an antenna whose antenna elements are arranged in parallel according to an embodiment of this application.

The foregoing describes, with reference to FIG. 2 to FIG. 5, improvement in decoupling performance and a radiation pattern of the antenna 100 by using the coupling stub 103 when the two antenna elements are arranged in serial. In addition, when applied to the antenna 100 in which the antenna elements are arranged in serial, a width W of an implemented antenna 100 is only 0.06 k (as mentioned above, k is a wavelength of an electromagnetic wave on which the antenna 100 operates and that corresponds to a center frequency), that is, high isolation and good coverage on a horizontal plane can be implemented. The width W of the antenna 100 herein refers to an overall width of the antenna 100, as shown in FIG. 2. For example, corresponding to a frequency band whose resonance frequency is 1920 MHz to 1980 MHz, a wavelength corresponding to a center frequency 1955 MHz of the frequency band is 15 cm. Therefore, it is obtained through calculation that a width of the antenna 100 of an antenna element that is arranged in serial may be 0.9 cm. In an embodiment, the width of the antenna 100 using the antenna elements that are arranged in serial is within a range of 0.05λ to 0.07λ, and good coverage on a horizontal plane can also be implemented while high isolation is implemented. For example, for an operating frequency band corresponding to a wavelength of 15 cm, the width of the antenna 100 may be within a range of 0.7 cm to 1.1 cm. In other words, by using the coupling stub 103 according to this embodiment of this application, the antenna 100 can be more compact, and implement high isolation and full coverage of a horizontal plane. The coupling stub 103 according to this embodiment of this application can also be applied to an antenna structure in which two antenna elements are arranged in parallel. FIG. 6 illustrates an example embodiment of a coupling stub 103 applied in such an antenna structure.

Similar to the connection manner shown in FIG. 2, when the coupling stub 103 is applied to the antenna elements that are arranged in parallel, the same connection manner is also used. For example, the coupling stub 103 is coupled to the first antenna element 101 through the first feeding end 1013 and the second feeding end 1015, that is, is coupled to the first radiation stub 1011 and the second radiation stub 1012 separately. The coupling stub 103 is coupled to the second radiation unit through the third feeding end 1023. In other words, the coupling stub 103 is coupled only to the third radiation stub 1021. To implement the foregoing connection manner, in an embodiment, the coupling stub 103 may include two stubs (which are referred to as a first stub 1031 and a second stub 1032 below). The first stub 1031 is electrically connected between the first radiation stub 1011 and the third radiation stub 1021. The second stub 1032 is electrically connected between the second radiation stub 1012 and the third radiation stub 1021, as shown in FIG. 6. In other words, in some embodiments, at least a part of the coupling stub 103 is arranged in a spacing area between the first antenna element 101 and the second antenna element 102.

When the coupling stub 103 is applied to antenna elements arranged in parallel, similar to a case in which the coupling stub 103 is applied to antenna elements arranged in serial, the coupling stub 103 can also implement effective isolation without affecting coverage on a horizontal plane. Specifically, when the first feeding part 1014 feeds the first antenna element 101 through the first feeding end 1013 and the second feeding end 1015, the induced current flows into the coupling stub 103 through the first radiation stub 1011 and the second radiation stub 1012, and then flows into the third radiation stub 1021 through the coupling stub 103. In this case, the induced current is in a same direction on the first radiation stub 1011 and the second radiation stub 1012, and changes to a current reverse direction after passing through the first stub 1031 and the second stub 1032 of the coupling stub 103, so that a return current is formed on the third radiation stub 1021 and does not flow to the fourth radiation stub 1022. In this case, the antenna 100 operates in a first mode.

When the second feeding part 1024 feeds the second antenna element 102 through the third feeding end 1023 and the fourth feeding end, the induced current flows into the coupling stub 103 after passing through the third radiation stub 1021 and the fourth radiation stub 1022, and then separately flows into the first radiation stub 1011 and the second radiation stub 1012 through the coupling stub 103. In this case, the induced current is in a same direction on the third radiation stub 1021 and the fourth radiation stub 1022, and then flows in a reverse direction after passing through the coupling stub 103, so that the induced current is in a reverse direction on the first radiation stub 1011 and the second radiation stub 1012. In this case, the antenna 100 operates in a second mode.

In other words, when the first feeding part 1014 feeds the first antenna element 101, the antenna 100 operates in the first mode. When the second feeding part 1024 feeds the second antenna element 102, the antenna 100 operates in the second mode. When the first feeding part 1014 performs feeding, the second antenna element 102 is not excited through mutual coupling, so that a current flows into the second feeding part 1024. As mentioned above, a current flowing into the third radiation stub 1021 forms a return current on the third radiation stub 1021 and the second stub 1032 of the coupling stub 103. When the second feeding part 1024 performs feeding, because currents on the first radiation stub 1011 and the second radiation stub 1012 are reverse, no current flows into the first feeding part 1014.

Figure 7:
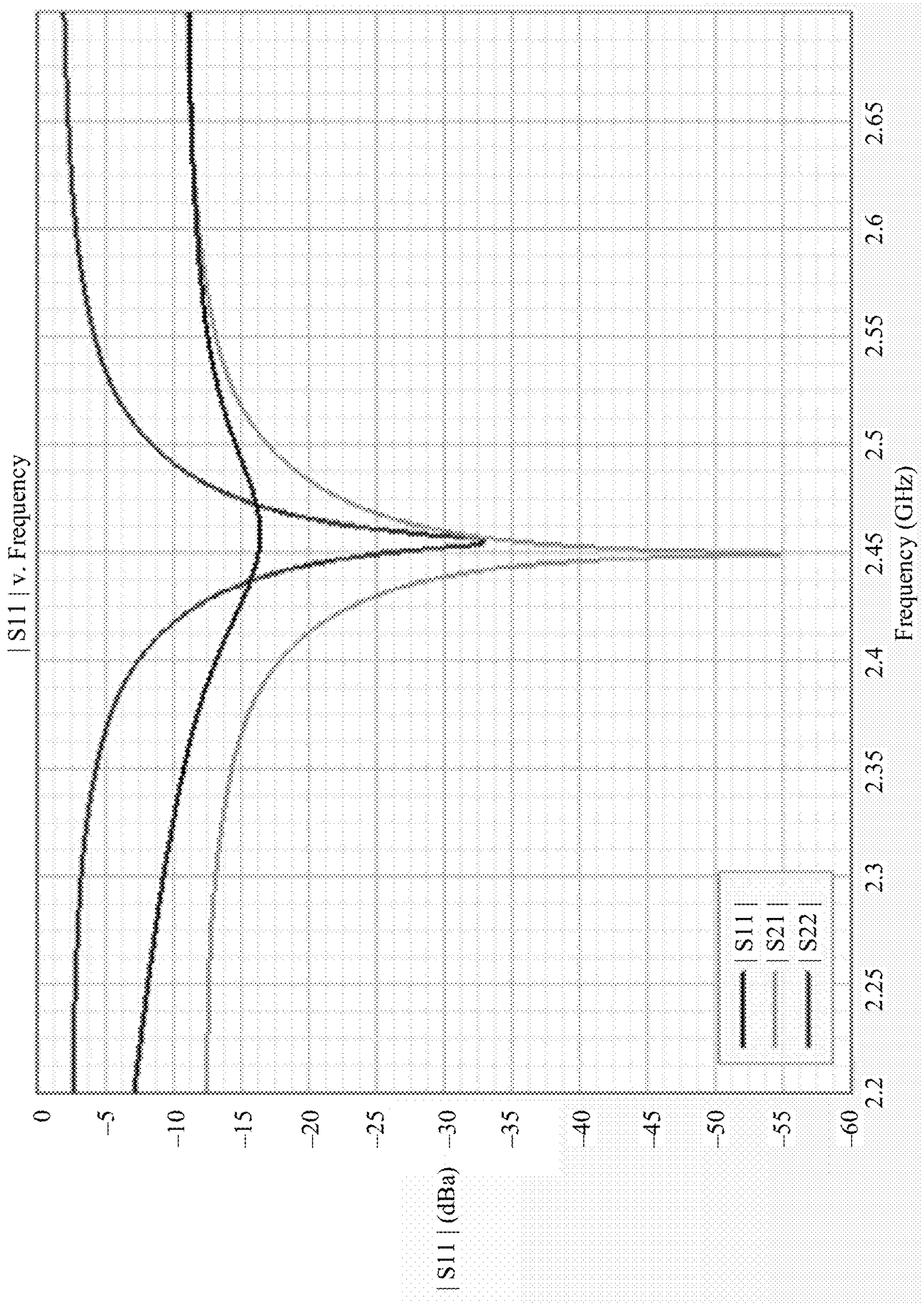
FIG. 7 shows S11 pairs of frequency curves of antennas whose antenna elements are arranged in parallel according to an embodiment of this application.

It can be learned that, by using the coupling stub 103, the two antenna elements arranged in parallel can also be effectively isolated when operating (for example, when feeding is performed on the first feeding part 1014 and the second feeding part 1024 separately). It can be clearly learned from the schematic diagram of antenna parameters shown in FIG. 7 that isolation between two antenna elements of the antenna 100 that is arranged in serial according to this embodiment of this application can reach more than −17 dB, and may reach a maximum of −55 dB, and this implements high isolation.

Figure 8:
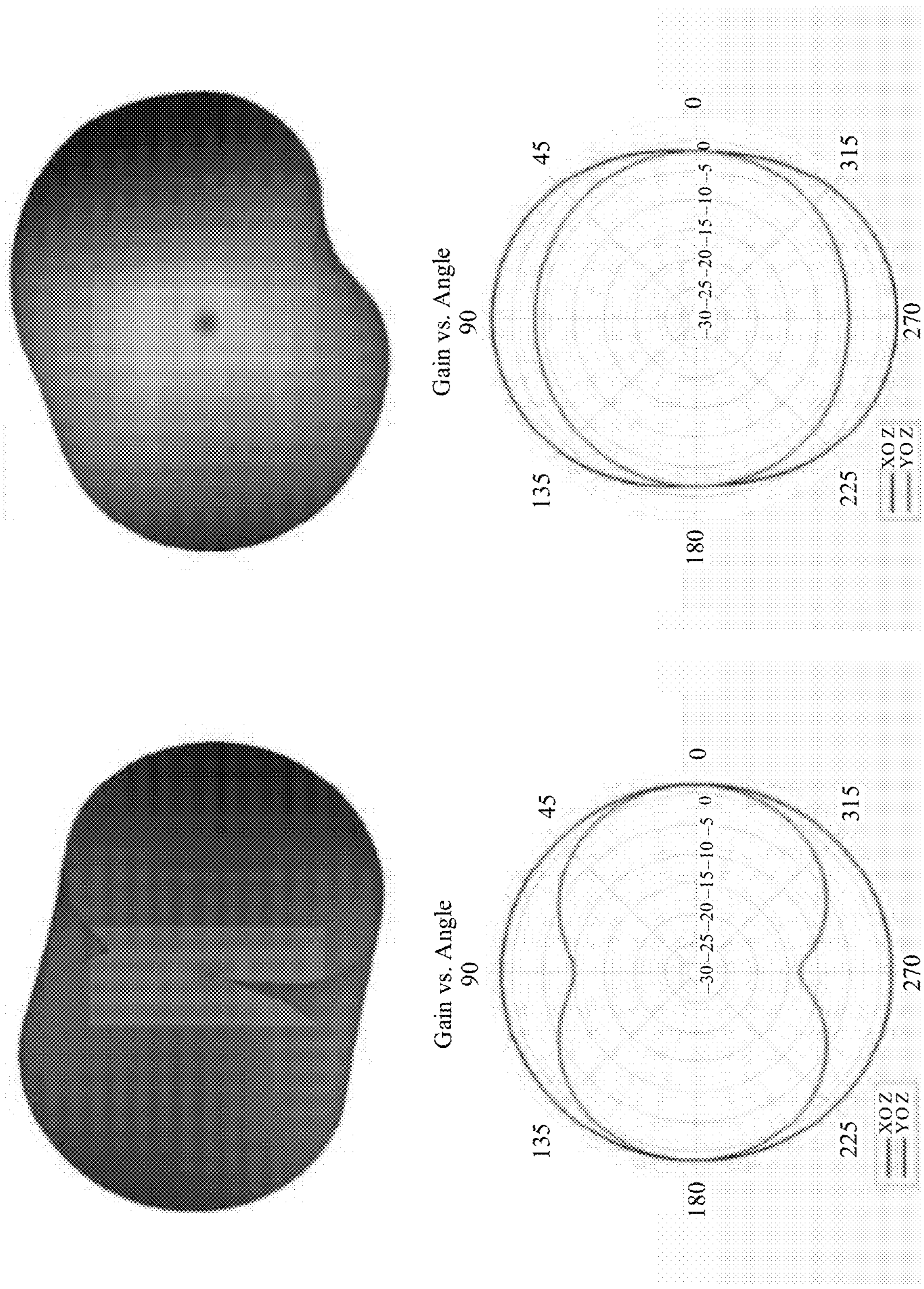
FIG. 8 shows a radiation pattern of an antenna whose antenna elements are arranged in parallel according to an embodiment of this application.
Figure 9:
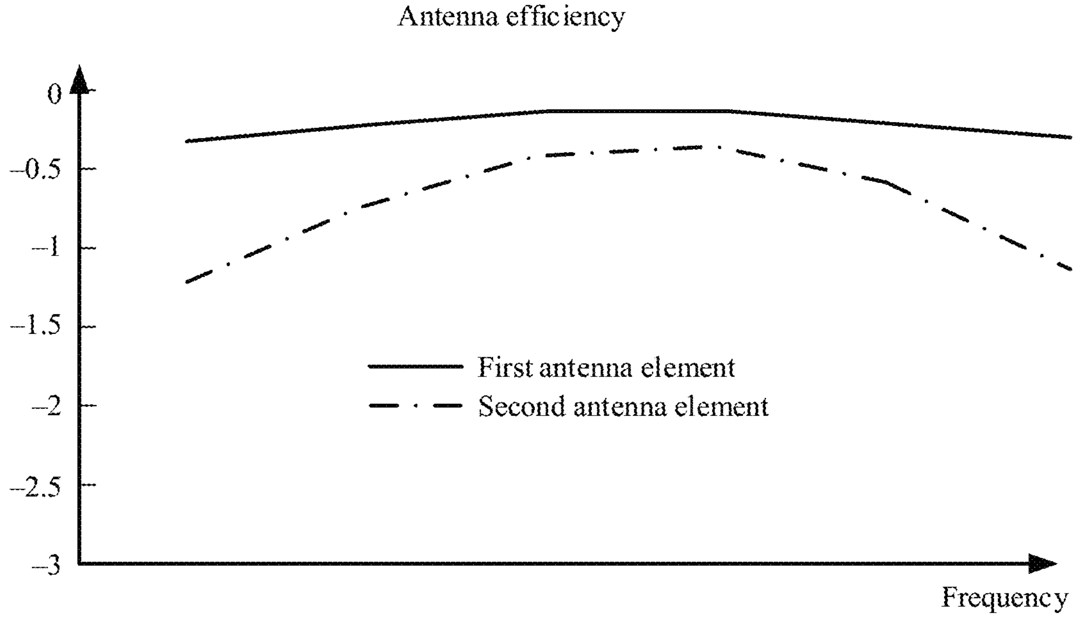
FIG. 9 is a schematic diagram of antenna efficiency of an antenna whose antenna elements are arranged in parallel according to an embodiment of this application.

FIG. 8 shows a radiation pattern of an antenna 100 in which antenna elements are arranged in parallel. An XOZ plane is a horizontal plane, a radiation pattern of a first antenna element 101 is on a left side, and a radiation pattern of a second antenna element 102 is on a right side. It can be learned from FIG. 8 that, different from several isolation solutions mentioned above, the directivity diagrams of the two antenna elements of the antenna according to this embodiment of the present disclosure can basically implement good coverage on a horizontal plane. FIG. 9 is a schematic diagram of antenna efficiency of an antenna 100 according to an embodiment of this application. It can be learned from FIG. 9 that, both the two antenna elements have high efficiency, and can meet a requirement that an imbalance degree between the two antenna elements is less than 3 dB in actual use.

Back to FIG. 6, in some embodiments, the coupling stub 103 may be formed as at least a part of the third radiation stub 1021. In this way, a structure of the third radiation stub 1021 is replaced by at least a part of the coupling stub 103, so that high isolation between the two antenna elements is implemented, and good coverage of the two antenna elements on the horizontal plane is not affected.

It can be learned from the foregoing description of the antenna 100 in which the antenna elements are arranged in parallel or serial that the coupling stub 103 mainly plays a decoupling function. In some embodiments, the coupling stub 103 may have only a current transmission capability and no radiation capability. In this manner, costs of the antenna 100 may be further reduced. Certainly, it should be understood that alternatively or additionally, the coupling stub 103 may alternatively have other functions in addition to decoupling. For example, in some embodiments, at least a part of the coupling stub 103 may alternatively have a radiation function.

In addition, when the coupling stub 103 is applied to the antenna 100 in which the antenna elements are arranged in parallel, a width W of an implemented antenna 100 according to this embodiment of this application is only 0.16λ (as mentioned above, λ is a wavelength of an electromagnetic wave on which the antenna 100 operates and that corresponds to a center frequency), that is, high isolation and good coverage on a horizontal plane can be implemented. The width W of the antenna 100 herein refers to an overall width of the antenna 100, as shown in FIG. 6. For example, for a frequency band whose resonance frequency is 1920 MHz to 1980 MHz, a wavelength corresponding to a center frequency 1955 MHz of the frequency band is 15 cm. Therefore, it is obtained through calculation that a width of the antenna 100 in which antenna elements are arranged in parallel may be 2.4 cm. In an embodiment, the width of the antenna 100 in which the antenna elements are arranged in serial is within a range of 0.15λ to 0.17λ, and good coverage on a horizontal plane can also be implemented while high isolation is implemented. For example, for an operating frequency band corresponding to a wavelength of 15 cm, the width of the antenna 100 may be within a range of 2.2 cm to 2.6 cm. In this way, high isolation can be achieved and good coverage on a horizontal plane can be achieved. In other words, by using the coupling stub 103 according to this embodiment of this application, the antenna 100 that is arranged in parallel can also be more compact, and high isolation and full coverage of a horizontal plane are implemented.

Figure 10:
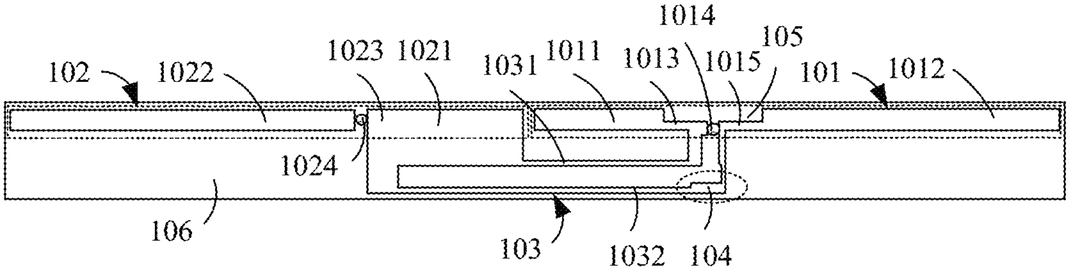
FIG. 10 is a schematic top view of an antenna whose antenna elements are arranged in serial according to an embodiment of this application.
Figure 11:
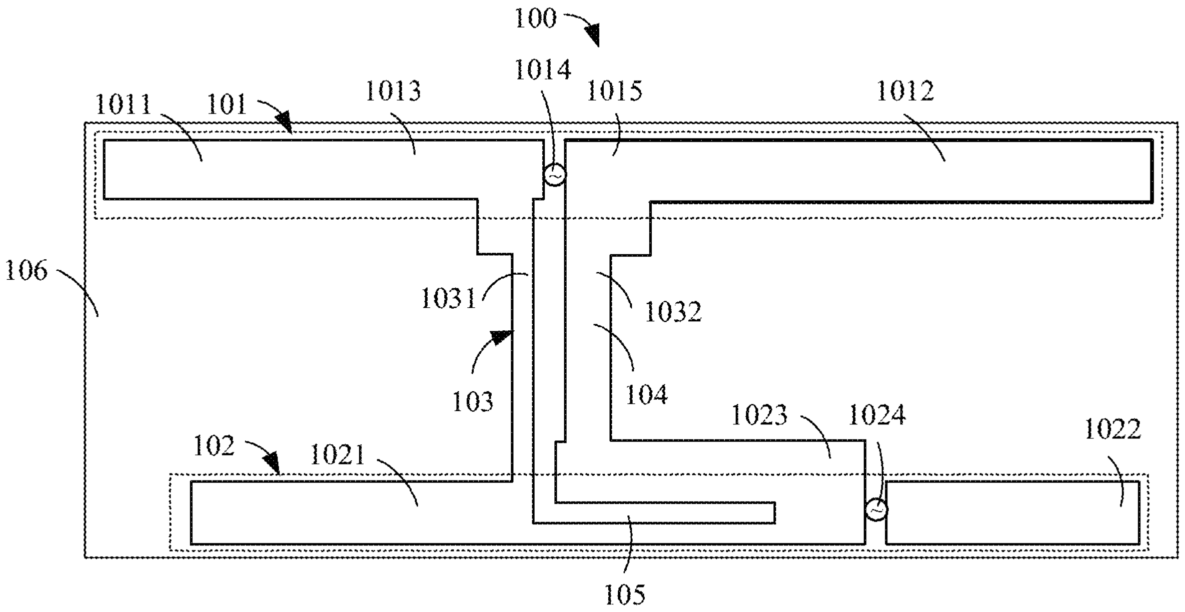
FIG. 11 is a schematic top view of an antenna whose antenna elements are arranged in parallel according to an embodiment of this application.

To implement impedance matching between the antenna 100 and a feeding network, and the like, in some embodiments, at least one local widened part 104 may be disposed on at least one of the first radiation stub 1011, the second radiation stub 1012, the third radiation stub 1021, and the coupling stub 103, as shown in FIG. 10 and FIG. 11. Based on a requirement, the local widened part 104 may be disposed at least one of a position with a smallest induced current (a zero-point position), a connection part between the coupling stub 103 and the antenna element, and a bending part of the coupling stub 103. FIG. 10 shows a disposition situation of the local widened part 104 of the antenna 100 whose operating frequency band is 2.4 GHz to 2.5 GHz in a case in which two antenna elements are arranged in serial. FIG. 11 shows a disposition situation of the local widened part 104 of the antenna 100 whose operating frequency band is 2.4 GHz to 2.5 GHz in a case in which two antenna elements are arranged in parallel.

It can be learned from FIG. 10 that, for the two antenna elements that are arranged in serial, the local widened part 104 is disposed in a middle part (shown by an ellipse box, corresponding to the zero point of the induced current) of the second stub 1032, a connection part between the second stub 1032, the second radiation stub 1012 and the third radiation stub 1021, and a connection part between the first stub 1031, the first radiation stub 1011, and the third radiation stub 1021. In this manner, the local widened part 104 is equivalent to forming capacitor loading on a corresponding stub. Impedance matching of an antenna system can be further promoted and distribution of the induced current on each stub can be adjusted, so that resonance of the antenna 100 can be adjusted, thereby improving performance of the antenna 100. An appropriate stub width may enable the antenna 100 to obtain the best S parameter. The stub width, a position and a size of the local widened part 104, and the like may be optimized through simulation.

By disposing the local widened part 104, for some antenna structures, the first stub 1031 and the second stub 1032 in the coupling stub 103 may be considered to be electrically connected to different ends of the third radiation stub 1021 separately, as shown in FIG. 10. The different ends herein are relative to an extension direction of the third radiation stub 1021, and the different ends include a third coupling end 1023 and an end that is of the third radiation stub 1021 and that is opposite to the third coupling part 1023 in the extension direction.

Similarly, for the two antenna elements that are arranged in parallel, for example, the local widened part 104 may also be disposed at positions such as the second stub 1032, the connection part between the second stub 1032, the second radiation stub 1012, and the third radiation stub 1021, and the connection part between the first stub 1031 and the first radiation stub 1011, to form capacitance loading at these positions to promote impedance matching, further to improve performance of the antenna 100. Further, in some embodiments, alternatively or additionally, at least one local narrowed part 105 may be disposed on at least one of the first radiation stub 1011, the second radiation stub 1012, the third radiation stub 1021, and the coupling stub 103, as shown in FIG. 10 and FIG. 11. Based on a requirement, the local narrowed part 105 may be disposed at a position like a position with a largest induced current. FIG. 10 shows a disposition situation of the local narrowed part 105 of an antenna 100 whose operating frequency band is 2.4 GHz to 2.5 GHz in a case in which two antenna elements are arranged in serial. FIG. 11 shows a disposition situation of the local narrowed part 105 of an antenna 100 whose operating frequency band is 2.4 GHz to 2.5 GHz in a case in which two antenna elements are arranged in parallel.

As shown in FIG. 11, the local narrowed part 105 is disposed in a part that is of the third radiation stub 1021 and that is adjacent to the second feeding part 1024, and a part that is of the second stub 1032 of the coupling stub 103 and that extends in a same direction as the third radiation stub 1021 after being bent may also be considered as a part of the third radiation stub 1021. In other words, in some antenna structures, the coupling stub 103 may also be considered as at least a part of the third radiation stub 1021.

In addition, it can be learned from FIG. 10 that, for the two antenna elements that are arranged in serial, the local narrowed part 105 is disposed at a position (corresponding to a position with a largest induced current) adjacent to a feeding end of the first radiation stub 1011 and the second radiation stub 1012. In this manner, the local narrowed part 105 is equivalent to forming inductor loading on a corresponding stub. Functions of the local narrowed part 105 are similar to those of the local widened part 104. The local narrowed part 105 can further promote impedance matching of the antenna system and adjust distribution of an induced current on each stub, so that resonance of the antenna 100 can be adjusted, thereby improving performance of the antenna 100. Similarly, for the two antenna elements that are arranged in parallel, the local narrowed part 105 may alternatively be disposed at some required positions, to form inductor loading at these positions, to promote impedance matching and improve performance of the antenna 100. According to the antenna 100 in this embodiment of the present disclosure, the local widened part 104 and the local narrowed part 105 are properly disposed, so that impedance matching of the antenna 100 can be promoted, thereby improving isolation between antenna elements. The following describes how the foregoing effects are implemented with reference to FIG. 12 to FIG. 15.

Figure 12:
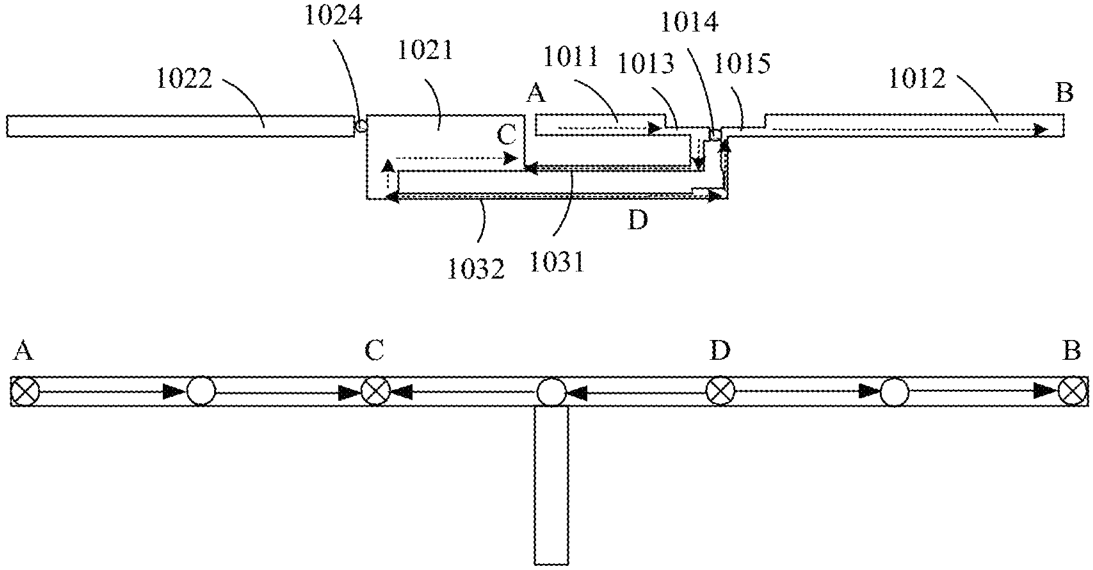
FIG. 12 to FIG. 15 are schematic diagrams of an induced current direction and an equivalent antenna of an antenna in different arrangement and feeding situations.

Specifically, FIG. 12 shows a schematic diagram (the foregoing figure) of a direction of an induced current in the antenna 100 and a schematic diagram of an equivalent antenna (the following figure) when the antenna elements are arranged in serial and the first feeding part 1014 feeds the first antenna element. In FIG. 12, the direction of the induced current is shown with dashed arrows at each radiation stub and coupling stub 103, and a schematic diagram of an equivalent antenna is obtained through simulation. In the schematic diagram of the equivalent antenna, four points A to D respectively correspond to the four points A to D in the schematic diagram of the direction of the induced current (the above figure), a hollow circle corresponds to a position with a largest induced current, and a cross circle corresponds to a position with a smallest induced current.

It can be learned from FIG. 12 that, by locally widening the third radiation stub 1021, the first stub 1031 and the second stub 1032 of the coupling stub 103 may be considered to be electrically connected to different ends of the third radiation stub 1021 separately. In this manner, when the first feeding part 1014 feeds the first antenna element, after passing through the first stub 1031 and the second stub 1032, the induced current forms a return current at the third radiation stub 1021, so that the induced current does not flow into the second feeding part 1024, and does not affect feeding of the second feeding part 1024.

Figure 13:
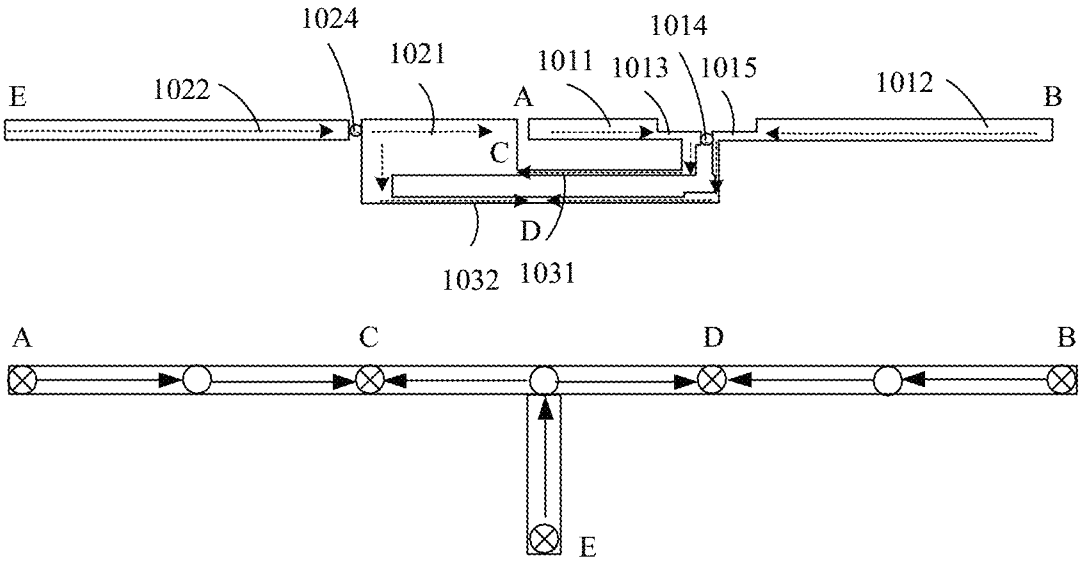

FIG. 13 shows a schematic diagram (the foregoing figure) of a direction of an induced current in the antenna 100 and a schematic diagram of an equivalent antenna (the following figure) when the antenna elements are arranged in serial and the second feeding part 1024 feeds the second antenna element. Similarly, in FIG. 13, the direction of the induced current is shown with dashed arrows at each radiation stub and coupling stub 103, and a schematic diagram of an equivalent antenna is obtained through simulation. In the schematic diagram of the equivalent antenna, five points A to E respectively correspond to the four points A to E in the schematic diagram of the direction of the induced current (the above figure), a hollow circle corresponds to a position with a largest induced current, and a cross circle corresponds to a position with a smallest induced current.

It can be learned from FIG. 13 that, when the third radiation stub 1021 is locally widened, and the second feeding part 1024 feeds the second antenna element, an induced current forms a reverse current on the first radiation stub 1011 and the second radiation stub 1012 after passing through the locally widened third radiation stub 1021, the first stub 1031, and the second stub 1032. Therefore, the induced current does not flow into the first feeding part 1014, and does not affect feeding of the first feeding part 1014. In this manner, high isolation between two antenna elements is implemented.

Figure 14:
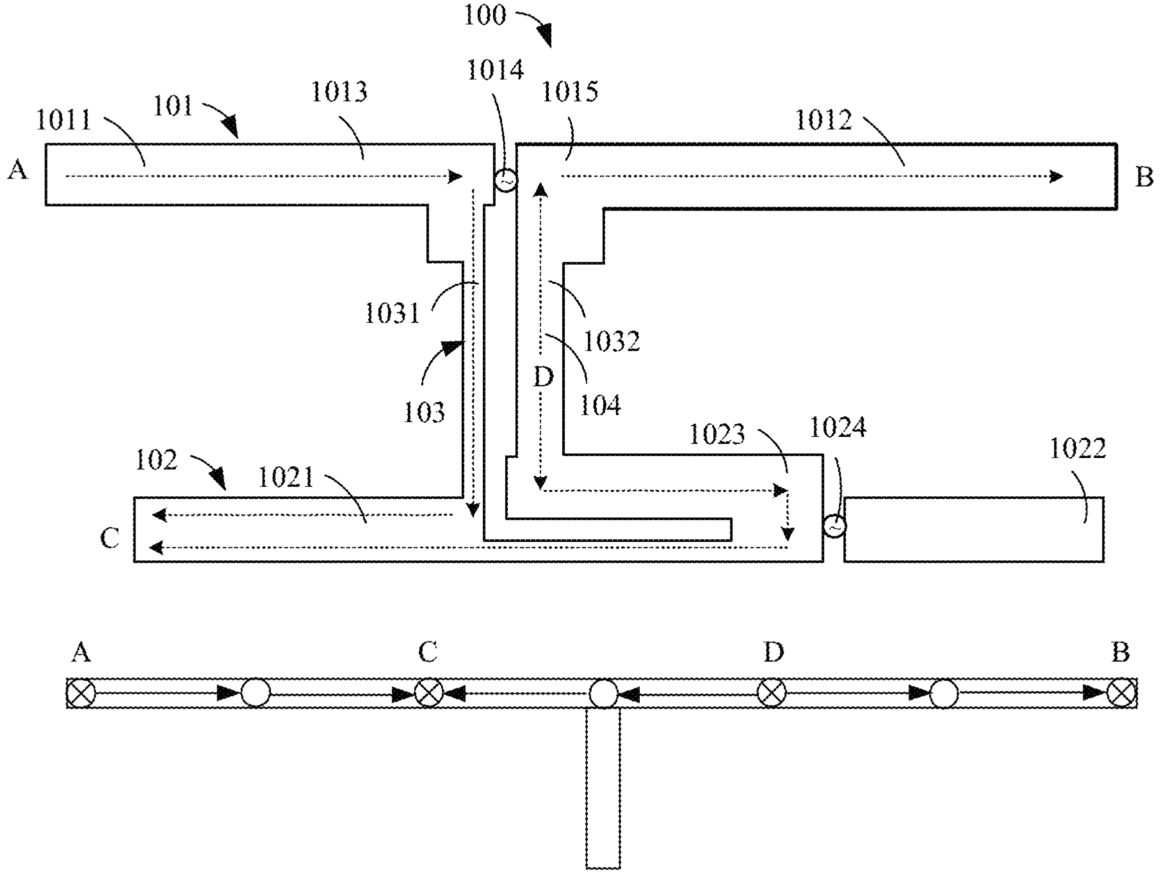

Specifically, FIG. 14 shows a schematic diagram (the foregoing figure) of a direction of an induced current in the antenna 100 and a schematic diagram of an equivalent antenna (the following figure) when the antenna elements are arranged in parallel and the first feeding part 1014 feeds the first antenna element. In FIG. 14, the direction of the induced current is shown with dashed arrows at each radiation stub and coupling stub 103, and a schematic diagram of an equivalent antenna is obtained through simulation. In the schematic diagram of the equivalent antenna, four points A to D respectively correspond to the four points A to D in the schematic diagram of the direction of the induced current (the above figure), a hollow circle corresponds to a position with a largest induced current, and a cross circle corresponds to a position with a smallest induced current.

It can be learned from FIG. 14 that, by locally narrowing the third radiation stub 1021, a part that is of the second stub 1032 and that extends in a same direction as the third radiation stub 1021 after being bent may also be considered as a part of the third radiation stub 1021. In this manner, when the first feeding part 1014 feeds the first antenna element, after passing through the first stub 1031 and the second stub 1032, the induced current forms a return current at the third radiation stub 1021, so that the induced current does not flow into the second feeding part 1024, and does not affect feeding of the second feeding part 1024.

Figure 15:
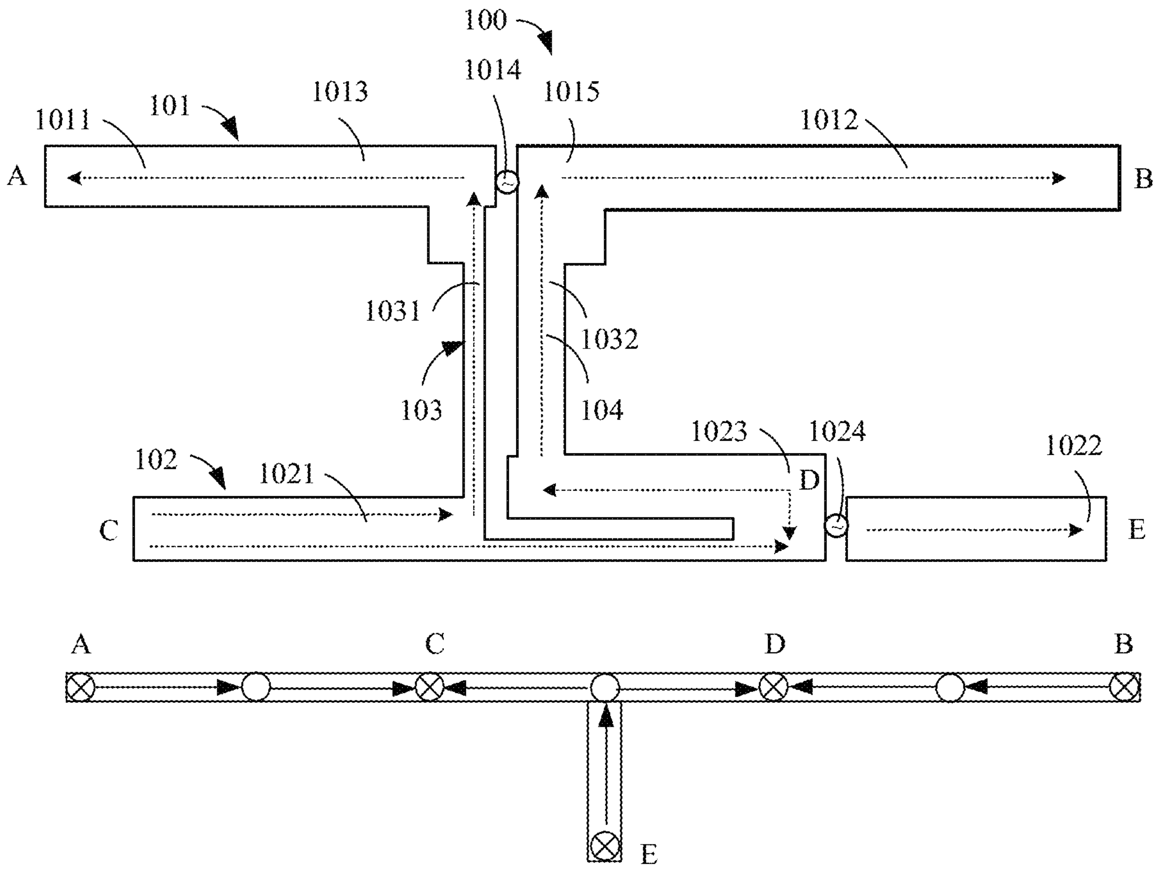

FIG. 15 shows a schematic diagram (the foregoing figure) of a direction of an induced current in the antenna 100 and a schematic diagram of an equivalent antenna (the following figure) when the antenna elements are arranged in parallel and the second feeding part 1024 feeds the second antenna element. Similarly, in FIG. 15, the direction of the induced current is shown with dashed arrows at each radiation stub and coupling stub 103, and a schematic diagram of an equivalent antenna is obtained through simulation. In the schematic diagram of the equivalent antenna, five points A to E respectively correspond to the four points A to E in the schematic diagram of the direction of the induced current (the above figure), a hollow circle corresponds to a position with a largest induced current, and a cross circle corresponds to a position with a smallest induced current.

It can be learned from FIG. 15 that, by disposing the local widened part and the local narrowed part, when the second feeding part 1024 feeds the second antenna element, an induced current forms a reverse current on the first radiation stub 1011 and the second radiation stub 1012 after passing through the third radiation stub 1021, the first stub 1031, and the second stub 1032. Therefore, the induced current does not flow into the first feeding part 1014, and does not affect feeding of the second feeding part 1024. In this manner, high isolation between two antenna elements is implemented.

With reference to FIG. 10 to FIG. 15, the foregoing separately describes a case in which a local widened part 104 and a local narrowed part 105 are disposed at a predetermined position of each stub (including a radiation stub and a coupling stub 103) in the antenna 100 in a case of a specific operating frequency of the antenna 100, to further promote impedance matching. It should be understood that this embodiment is merely an example, and is not intended to limit the protection scope of this application. Based on different frequencies of operation, it is also possible that each stub in the antenna 100 has any other suitable arrangement for factors such as impedance matching. For example, in some embodiments, alternatively or additionally, the coupling stub 103 may alternatively be formed in a sawtooth or curved shape.

It can be learned from the foregoing example description that, compared with the foregoing several isolation improvement solutions, the antenna 100 according to this embodiment of this application has a more compact size, achieves a better decoupling effect, and enables higher isolation between antenna elements. In addition, the antenna 100 according to this embodiment of this application can implement good full coverage on a horizontal plane, so that a coverage area of the antenna 100 is wider.

Although the subject matter is described in a language specific to structural features and/or method logic actions, it should be understood that the subject matter defined in the appended claims is not necessarily limited to the particular features or actions described above. On the contrary, the particular features and actions described above are merely example forms for implementing the claims.

What is claimed is:

1. An antenna, comprising:

a first antenna element, comprising a first radiation stub having a first feeding end and a second radiation stub having a second feeding end;

a first feeding part coupled to the first feeding end and the second feeding end;

a second antenna element, comprising a third radiation stub having a third feeding end and a fourth radiation stub having a fourth feeding end;

a second feeding part coupled to the third feeding end and the fourth feeding end; and a coupling stub coupled to the first antenna element through the first feeding end and the second feeding end and coupled to the second antenna element through the third feeding end, wherein the coupling stub comprises:

a first stub that is electrically connected between the first radiation stub and the third radiation stub; and a second stub that is electrically connected between the second radiation stub and the third radiation stub.

2. The antenna of claim 1, wherein the first stub and the second stub are electrically connected to different ends of the third radiation stub.

3. The antenna of claim 1, wherein the first feeding end and the second feeding end are spaced apart to form a first slot, and wherein the third feeding end and the fourth feeding end are spaced apart to form a second slot.

4. The antenna of claim 1, wherein the first antenna element and the second antenna element are collinear and spaced apart, and wherein the coupling stub is located on a same side of the first radiation stub and the second radiation stub.

5. The antenna of claim 1, wherein the first antenna element and the second antenna element are parallel and spaced apart, and wherein at least a part of the coupling stub is arranged in a spacing area between the first antenna element and the second antenna element.

6. The antenna of claim 1, wherein at least one of a first width of the first radiation stub, a second width of the second radiation stub, a third width of the third radiation stub, or a fourth width of the fourth radiation stub is greater than a fifth width of the coupling stub.

7. The antenna of claim 6, wherein a ratio of the fifth width to any one of the first width, the second width, the third width, or the fourth width is within a range of 4:1 to 1:1.

8. The antenna of claim 1, wherein at least one of the first radiation stub, the second radiation stub, the third radiation stub, or the coupling stub is strip-shaped and has at least one of a local widened part or a local narrowed part at a predetermined position.

9. The antenna of claim 1, wherein at least one of the first radiation stub, the second radiation stub, the third radiation stub, or the coupling stub comprises a local widened part, and wherein the local widened part corresponds to a position with a smallest induced current on a corresponding stub.

10. The antenna of claim 1, wherein at least one of the first radiation stub, the second radiation stub, the third radiation stub, or the coupling stub comprises a local narrowed part, and wherein the local narrowed part corresponds to a position with a largest induced current on a corresponding stub.

11. The antenna of claim 1, wherein the antenna is locally widened in at least one of a first connecting part connecting the coupling stub and the first antenna element, a second connecting part connecting the coupling stub and the second antenna element, or a bending part of the coupling stub.

12. The antenna of claim 1, wherein the coupling stub is coplanar with the first antenna element and the second antenna element.

13. The antenna of claim 1, wherein the first antenna element and the second antenna element are dipole antenna elements.

14. The antenna of claim 1, wherein the first antenna element and the second antenna element are configured to operate in a same operating frequency band.

15. An electronic device comprising:

a housing comprising an inner side;

a circuit board disposed in the housing; and an antenna at least partially arranged on the inner side and comprising:

a first feeding part and a second feeding part disposed on the circuit board;

a first antenna element, comprising a first radiation stub having a first feeding end and a second radiation stub having a second feeding end;

a first feeding part disposed on the circuit board and coupled to the first feeding end and the second feeding end;

a second antenna element, comprising a third radiation stub having a third feeding end and a fourth radiation stub having a fourth feeding end;

a second feeding part disposed on the circuit board and coupled to the third feeding end and the fourth feeding end; and a coupling stub, coupled to the first antenna element through the first feeding end and the second feeding end, and coupled to the second antenna element through the third feeding end, wherein the coupling stub comprises:

a first stub that is electrically connected between the first radiation stub and the third radiation stub; and a second stub that is electrically connected between the second radiation stub and the third radiation stub.

16. The electronic device of claim 15, wherein the circuit board is separated from the first antenna element and the second antenna element, and wherein the first antenna element and the second antenna element are coupled to the first feeding part and the second feeding part through a coaxial cable.

17. The electronic device of claim 15, further comprising a dielectric substrate, configured to carry the first antenna element, the second antenna element, and the coupling stub.

18. The electronic device of claim 17, wherein the first antenna element, the second antenna element, and the coupling stub are printed on the dielectric substrate.

19. An antenna, comprising:

a first antenna element, comprising a first radiation stub having a first feeding end and a second radiation stub having a second feeding end;

a first feeding part coupled to the first feeding end and the second feeding end;

a second antenna element, comprising a third radiation stub having a third feeding end and a fourth radiation stub having a fourth feeding end;

a second feeding part coupled to the third feeding end and the fourth feeding end; and a coupling stub coupled to the first antenna element through the first feeding end and the second feeding end and coupled to the second antenna element through the third feeding end, wherein the coupling stub is coupled only to the third radiation stub of the second antenna element.

20. The antenna of claim 19, wherein the coupling stub comprises a first stub and a second stub, wherein the first stub is electrically connected between the first radiation stub and the third radiation stub, and wherein the second stub is electrically connected between the second radiation stub and the third radiation stub.

* * * * *